(12) United States Patent
Nagahara et al.

(10) Patent No.: US 8,953,721 B2
(45) Date of Patent: Feb. 10, 2015

(54) CROSS CORRELATION DETERMINATION METHOD AND CROSS CORRELATION DETERMINATION DEVICE

(75) Inventors: Mikio Nagahara, Yamagata-mura (JP); Hideo Sasahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 427 days.

(21) Appl. No.: 13/303,094

(22) Filed: Nov. 22, 2011

(65) Prior Publication Data

US 2012/0134392 A1    May 31, 2012

(30) Foreign Application Priority Data

Nov. 26, 2010   (JP) .................................. 2010-263247

(51) Int. Cl.
   *G01S 19/13*    (2010.01)
   *G01S 19/24*    (2010.01)
   *G01S 19/30*    (2010.01)

(52) U.S. Cl.
   CPC ............... *G01S 19/243* (2013.01); *G01S 19/30* (2013.01)
   USPC ....................................................... 375/343

(58) Field of Classification Search
   CPC ............... G01S 1/00; G01S 5/02; G01S 5/14; G01S 7/40; G01S 19/23; H04B 1/707; H04B 7/185; H04B 1/00; H04B 15/00; H04L 27/06; H04L 1/00; H04L 27/30; G06F 11/00; H03D 1/00; H03M 13/00; H04K 1/00
   USPC .......... 342/173, 357.03, 357.15, 357.25, 457; 375/150, 316, 343; 701/207, 213, 214, 701/216
   See application file for complete search history.

(56) References Cited

U.S. PATENT DOCUMENTS

| | | | | |
|---|---|---|---|---|
| 5,576,715 A | * | 11/1996 | Litton et al. | ............. 342/357.72 |
| 6,104,978 A | * | 8/2000 | Harrison et al. | ............... 701/470 |
| 6,125,135 A | * | 9/2000 | Woo et al. | ...................... 375/130 |
| 6,163,567 A | * | 12/2000 | Hatch | ........................... 375/149 |
| 6,546,064 B1 | * | 4/2003 | Hayashi | ......................... 375/354 |
| 6,967,992 B1 | * | 11/2005 | Rabaeijs et al. | .............. 375/150 |
| 8,149,164 B2 | * | 4/2012 | Yu et al. | .................... 342/357.77 |
| 8,238,411 B2 | * | 8/2012 | Valio et al. | ...................... 375/150 |
| 2004/0071221 A1 | * | 4/2004 | Nakada et al. | ................. 375/343 |
| 2004/0248533 A1 | * | 12/2004 | Mannermaa | ................... 455/139 |
| 2008/0112469 A1 | * | 5/2008 | Goldberg et al. | ............. 375/150 |
| 2008/0129585 A1 | * | 6/2008 | Roh | .......................... 342/357.01 |
| 2010/0134349 A1 | * | 6/2010 | Lennen et al. | ............ 342/357.03 |
| 2014/0132446 A1 | * | 5/2014 | Lennen | ..................... 342/357.51 |

FOREIGN PATENT DOCUMENTS

| | | |
|---|---|---|
| JP | 11-118900 A | 4/1999 |
| JP | 2003-084055 A | 3/2003 |
| JP | 2010-197189 A | 9/2010 |

* cited by examiner

*Primary Examiner* — Jaison Joseph
*Assistant Examiner* — Shawkat M Ali
(74) *Attorney, Agent, or Firm* — Kilpatrick Townsend & Stockton LLP

(57) ABSTRACT

A cross correlation determination method includes: executing a first decoding of decoding a navigation message included in a received satellite signal using a first replica code and a second decoding of decoding the navigation message using a second replica code; and determining the occurrence of a cross correlation using the result of the first decoding and the result of the second decoding.

9 Claims, 18 Drawing Sheets

[SELECTION OF COMPARISON PARAMETER]

| EPHEMERIS PARAMETER TYPE | SUITABILITY OF USE IN COMPARISON | |
|---|---|---|
| | SAME ORBIT | DIFFERENT ORBIT |
| ISSUE OF DATA OF EPHEMERIS: IODE | ○ | ○ |
| EPOCH TIME: $t_{oe}$ | △ | △ |
| SEMI-MAJOR AXIS OF ORBIT: $A^{1/2}$ | × | ○ |
| ECCENTRICITY: $e$ | × | ○ |
| LONGITUDE OF ASCENDING NODE OF ORBIT PLANE AT WEEKLY EPOCH: $\Omega_0$ | × | ○ |
| INCLINATION ANGLE AT REFERENCE TIME: $i_0$ | × | ○ |
| ARGUMENT OF PERIGEE: $\omega$ | × | ○ |
| MEAN ANOMALY AT REFERENCE TIME: $M_0$ | ○ | ○ |

- EPHEMERIS IDENTIFICATION PARAMETER
- ORBITAL SHAPE CALCULATION PARAMETER
- ORBIT PLANE CALCULATION PARAMETER
- SATELLITE POSITION DESIGNATION PARAMETER

| SATELLITE NUMBER | 2 | 5 | 8 | 10 | 13 | ... |
|---|---|---|---|---|---|---|
| 2 | | CORRECT | FALSE (SUBJECT) | CORRECT | CORRECT | ... |
| 5 | | | CORRECT | FALSE (OTHER) | CORRECT | ... |
| 8 | | | | CORRECT | CORRECT | ... |
| 10 | | | | | FALSE (SUBJECT) | ... |
| 13 | | | | | | ... |
| ... | | | | | | |

SUBJECT SATELLITE (rows) / OTHER SATELLITE (columns)

CORRECT: DETERMINE THAT CORRECT CORRELATION IS ACHIEVED
FALSE: DETERMINE THAT CROSS CORRELATION IS ACHIEVED
(SUBJECT): SUBJECT SATELLITE IS FALSE ACQUISITION SATELLITE
(OTHER): OTHER SATELLITE IS FALSE ACQUISITION SATELLITE

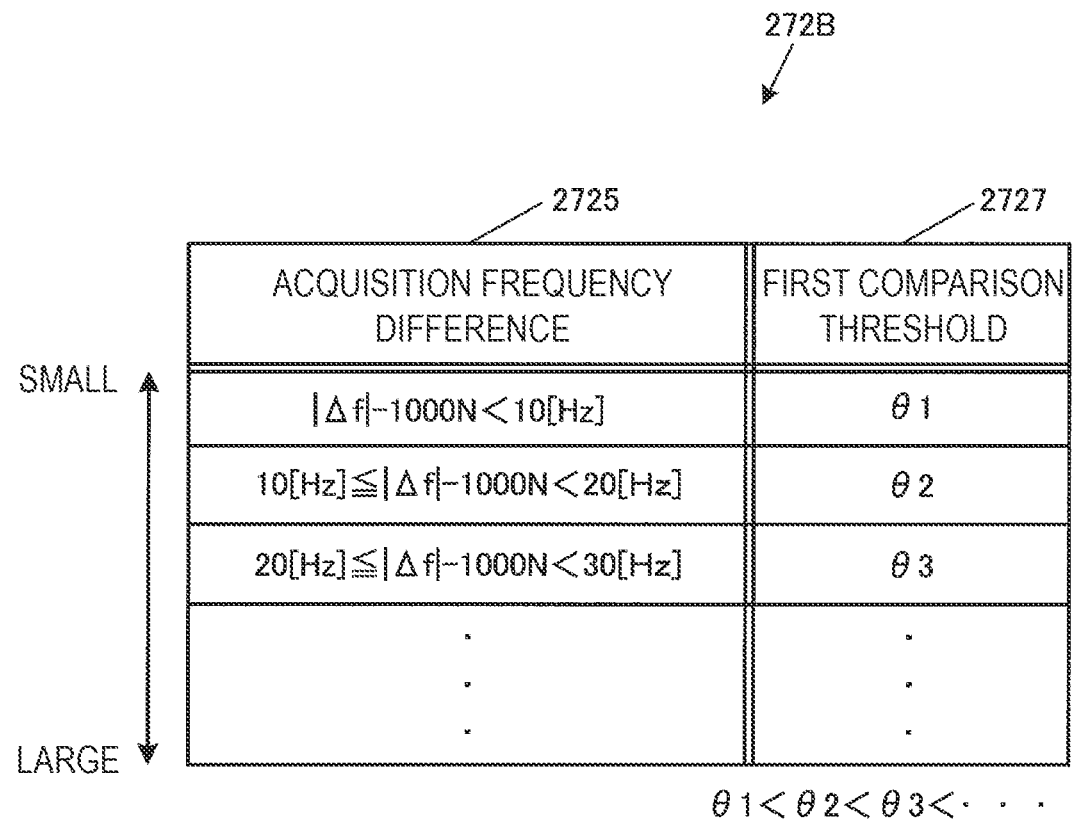

272B

| ACQUISITION FREQUENCY DIFFERENCE | FIRST COMPARISON THRESHOLD |
|---|---|
| $\|\Delta f\|-1000N<10[Hz]$ | $\theta 1$ |
| $10[Hz]\leqq\|\Delta f\|-1000N<20[Hz]$ | $\theta 2$ |
| $20[Hz]\leqq\|\Delta f\|-1000N<30[Hz]$ | $\theta 3$ |
| ⋮ | ⋮ |

2725 / 2727

SMALL ↑ / LARGE ↓

$\theta 1 < \theta 2 < \theta 3 < \cdots$

FIG.18

CROSS CORRELATION DETERMINATION METHOD AND CROSS CORRELATION DETERMINATION DEVICE

This application claims priority to Japanese Patent Application No. 2010-263247, filed Nov. 26, 2010, the entirety of which is hereby incorporated by reference.

BACKGROUND

1. Technical Field

The present invention relates to a method and the like for determining the occurrence of a cross correlation.

2. Related Art

GPS (Global Positioning System) is widely known as a positioning system which uses a positioning signal and is used in a receiver that is provided in a mobile phone, a car navigation device, and the like. In the GPS, a position calculation computation is performed so as to calculate the position coordinates and timepiece errors of the receiver based on information such as the positions of a plurality of GPS satellites and a pseudo-range from each GPS satellite to the receiver.

A GPS satellite signal transmitted from a GPS satellite is modulated with spread codes, called C/A (Coarse and Acquisition) codes, different for each GPS satellite. The C/A codes are pseudo-random noise codes in which one PN frame has a code length of 1023 chips and which are repeated at a cycle of 1 ms. In order to acquire a GPS satellite signal from a weak reception signal, the receiver performs an operation of calculating a correlation between the reception signal and replica C/A codes which are pseudo C/A codes generated locally by the receiver to thereby acquire a GPS satellite signal based on a correlation value obtained as a result of the correlation.

Since the C/A codes are so-called Gold codes, a high correlation value is not obtained unless a correlation is calculated between a reception signal and a replica C/A code of a correct GPS satellite signal. However, the overall magnitude of the obtained correlation value can vary depending on the reception conditions of GPS satellite signals. Thus, for example, when the signal strength of a reception signal is strong, even if a correlation is calculated between the strong reception signal and a replica C/A code of the wrong satellite, a correlation value having a predetermined value or more is obtained. Thus, it is determined that a correlation is achieved. This is the case where a cross correlation occurs.

In this specification, a correlation when a satellite assumed by a GPS receiver is identical to an actual satellite will be defined as "correct correlation". In contrast, a correlation when a satellite assumed by a GPS receiver is different from an actual satellite will be defined as "cross correlation". When a cross correlation occurs, there is a problem in that the accuracy of position calculation decreases. Thus, various techniques for determining the occurrence of a cross correlation have been proposed (for example, see JP-A-2003-84055).

In the technique disclosed in JP-A-2003-84055, the occurrence of a cross correlation is determined by performing threshold determination on correlation values obtained by a correlation operation in a stepwise manner. In the technique disclosed in JP-A-2003-84055, it is necessary to appropriately set the threshold steps in order to make a cross correlation determination. However, reception conditions such as the signal strength and the reception environment when the receiver receives GPS satellite signals change from time to time. Therefore, there is another problem in that making a cross correlation determination in accordance with uniform determination criteria does not guarantee the reliability of determination.

SUMMARY

An advantage of some aspects of the invention is to propose a new method for the determination of the occurrence of a cross correlation.

A first aspect of the invention is directed to a cross correlation determination method including: executing a first decoding of decoding a navigation message included in a received satellite signal using a first replica code and a second decoding of decoding the navigation message using a second replica code; and determining the occurrence of across correlation using the result of the first decoding and the result of the second decoding.

According to another aspect of the invention, there is provided a cross correlation determination device including: a decoding unit that executes a first decoding of decoding a navigation message included in a received satellite signal using a first replica code and a second decoding of decoding the navigation message using a second replica code; and a determination unit that determines the occurrence of a cross correlation using the result of the first decoding and the result of the second decoding.

According to the first aspect and the like, a first decoding of decoding a navigation message included in a received satellite signal using a first replica code and a second decoding of decoding the navigation message using a second replica code are executed. Moreover, the occurrence of a cross correlation is determined using the result of the first decoding and the result of the second decoding. When the navigation message is decoded using only one replica code, it is difficult to determine whether a correct correlation or a cross correlation is achieved. However, as in the first aspect and the like, when the navigation message is decoded using two different replica codes, and the first decoding result and the second decoding result are compared with each other, it is possible to easily determine whether a cross correlation has occurred or not.

As a second aspect, the cross correlation determination method of the first aspect may be configured such that the determining includes comparing information unique to a satellite, included in the navigation message among the first and second decoding results.

The information unique to the satellite, included in the navigation message is different for each reception satellite signal. Thus, when comparing the result of the first decoding and the result of the second decoding, by comparing the information unique to the satellite included in the navigation message, it is possible to appropriately determine a cross correlation.

As a third aspect, the cross correlation determination method of the second aspect may be configured such that the comparing includes comparing the information bit by bit, and the determining includes determining the occurrence of a cross correlation based on the result of the bit-by-bit comparison.

According to the third aspect, the information unique to the satellite, included in the navigation message is compared bit by bit, and the occurrence of a cross correlation is determined based on the comparison result. By comparing the contents (for example, numerical values) of the information unique to the satellite bit by bit rather than determining whether the contents are the same or different, it is possible to realize a cross correlation determination which allows decoding errors or bit loss to some extent.

As a fourth aspect, the cross correlation determination method of the second or third aspect may be configured such that the comparing includes comparing data storage portions of ephemeris of a satellite, included in the navigation message among the first and second decoding results.

According to the fourth aspect, the data storage portions of the ephemeris of the satellite, included in the navigation message among the first and second decoding results are compared. In the data storage portions of the ephemeris, orbit information unique to each satellite is included. Thus, by comparing the data storage portions with each other, it is possible to determine a cross correlation relatively easily.

As a fifth aspect, the cross correlation determination method of the fourth aspect may be configured such that the comparing includes comparing at least a number identifying ephemeris or a value designating a satellite position.

According to the fifth aspect, at least the number identifying the ephemeris or the value designating the satellite position is compared. The number identifying the ephemeris is a number unique to each ephemeris, and the value designating the satellite position is a value unique to each satellite. Thus, comparison of these parameters is ideal for the determination of a cross correlation.

As a sixth aspect, the cross correlation determination method of any one of the first to fifth aspects may be configured to further include changing determination criteria of the cross correlation based on the difference between a signal quality during the first decoding and a signal quality during the second decoding.

According to the sixth aspect, it is possible to optimize the cross correlation determination criteria based on the difference between the signal quality during the first decoding and the signal quality during the second decoding.

As a seventh aspect, the cross correlation determination method of any one of the first to fifth aspects may be configured to further include changing determination criteria of the cross correlation based on the difference between an acquisition frequency during the first decoding and an acquisition frequency during the second decoding.

According to the seventh aspect, it is possible to optimize the cross correlation determination criteria based on the difference between the acquisition frequency during the first decoding and the acquisition frequency during the second decoding.

BRIEF DESCRIPTION OF THE DRAWINGS

The invention will be described with reference to the accompanying drawings, wherein like numbers reference like elements.

FIG. 6 is a diagram illustrating a third determination method.

FIG. 10 is a diagram showing an example of a data configuration of cross correlation determination data.

FIG. 18 is a diagram showing an example of a table configuration of a first comparison threshold table according to a modified example.

DESCRIPTION OF EXEMPLARY EMBODIMENTS

Figure 1:
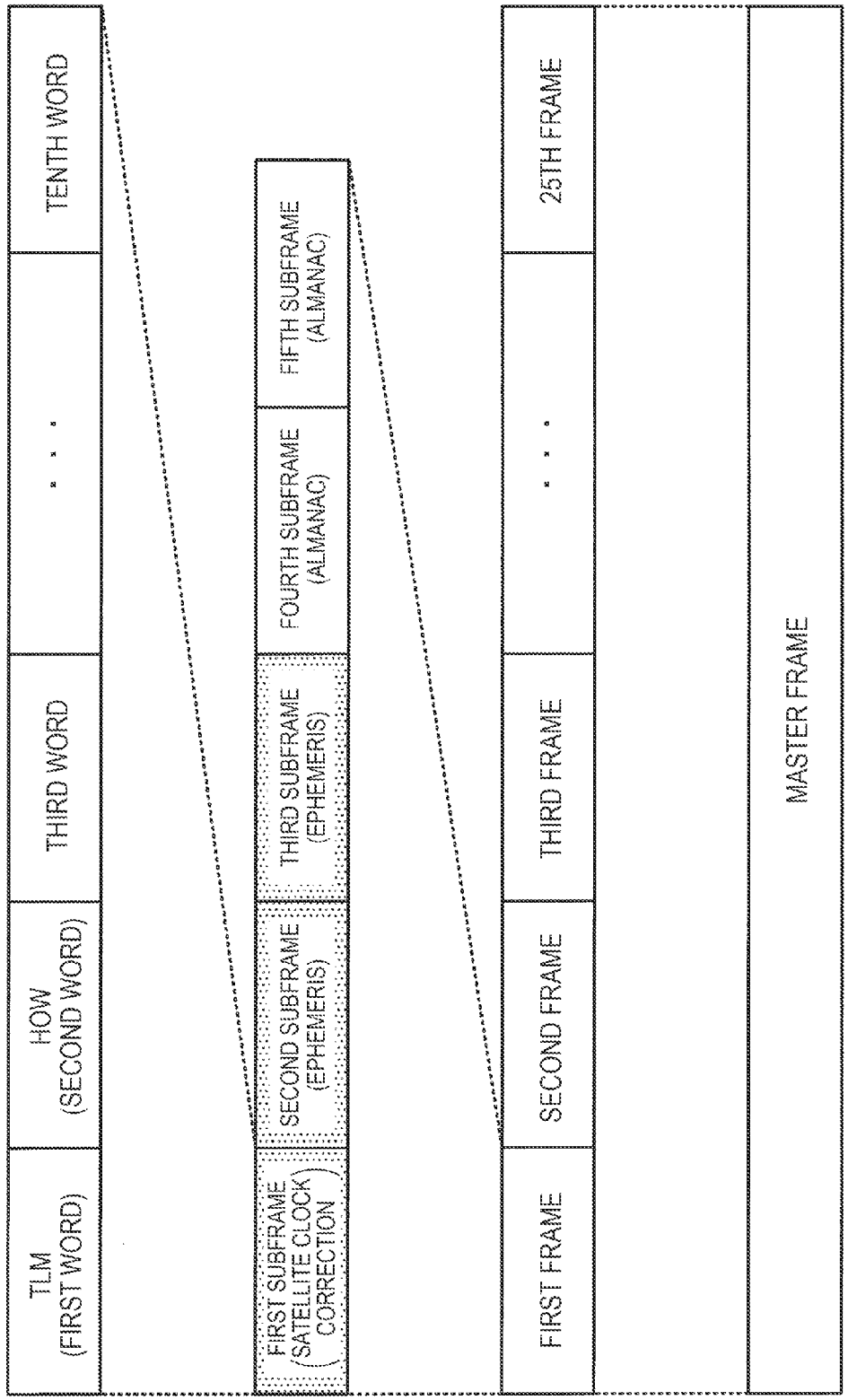
FIG. 1 is a diagram illustrating a navigation message in a GPS.

Hereinafter, exemplary embodiments of the invention will be described with reference to the drawings. It should be noted that embodiments to which the invention can be applied are not limited to the embodiments described below.

1. Principle

First, a cross correlation determination method according to the present embodiment will be described. In the present embodiment, a case of determining the occurrence of a cross correlation when a GPS satellite signal transmitted from a GPS satellite is received will be described by way of an example of a GPS (Global Positioning System) which is one kind of satellite positioning system.

In a satellite positioning system using a GPS, a GPS satellite which is one kind of positioning satellite sends the navigation message on a GPS satellite signal which is one kind of positioning satellite signal, the navigation message including satellite orbit data commonly called ephemeris or almanac. The GPS satellite signal is a 1.57542-GHz communication signal modulated with C/A (Coarse Acquisition) codes, which are one kind of spread code, by a CDMA (Code Division Multiple Access) method known as a spectrum spreading method. The C/A codes are pseudo-random noise codes in which one PN frame has a code length of 1023 chips and which are repeated at a cycle of 1 ms, and are codes unique to each GPS satellite.

The frequency used when the GPS satellite sends the GPS satellite signal is determined in advance as 1.57542 GHz (hereinafter referred to as a "prescribed carrier frequency"). However, due to the influence of a Doppler effect occurring by the movement of the GPS satellite and the GPS receiver, the frequency when the GPS receiver receives the GPS satellite signal is not always identical to the prescribed carrier frequency. Thus, the GPS receiver uses a method in which an operation of calculating a correlation between the received GPS satellite signal and a replica C/A code which is a pseudo C/A code locally generated by the GPS receiver in both frequency and phase directions to thereby acquire the GPS satellite signal.

The correlation operation in the frequency direction is an operation (a so-called frequency search) for specifying the frequency (hereinafter referred to as a "reception frequency") of a "reception carrier signal" which is the signal of a received carrier wave (carrier). Moreover, the correlation operation in the phase direction is an operation (a so-called phase search) for specifying the phase (hereinafter referred to as a "code phase") of a "reception C/A code" which is the C/A code of a reception signal.

As a specific processing procedure, for example, when removing a carrier from a reception carrier signal and performing the operation of calculating a correlation between a reception C/A code and a replica C/A code, the correlation operation is executed while changing the frequency of a carrier removal signal and the phase of the replica C/A code. Moreover, the frequency of the carrier removal signal and the phase of the replica C/A code at which the correlation value obtained by the correlation operation reaches its maximum are specified.

A unique C/A code is allocated to each GPS satellite. The GPS receiver tries to acquire a GPS satellite signal from each of GPS satellites (hereinafter referred to as "acquisition target satellites") to be subject to acquisition using a replica C/A code which is the replica of a C/A code of the acquisition target satellite.

However, in a so-called cold start state where the GPS receiver starts a position measurement process without holding satellite orbit data such as almanac or ephemeris, the GPS receiver may not be able to specify a satellite positioned in the sky. Thus, the GPS receiver tries to acquire the GPS satellite signal using the replica C/A code sequentially with respect to all GPS satellites. Naturally, even when the GPS receiver is not in the cold start state but the position of a GPS satellite positioned in the sky is determined to some extent, the GPS receiver may try to acquire the GPS satellite signal sequentially with respect to all GPS satellites which are likely to be positioned in the sky.

Since the C/A codes are so-called Gold codes, a high correlation value is not obtained unless a correlation is calculated between a reception signal and a replica C/A code of a correct GPS satellite signal. However, the overall magnitude of the obtained correlation value can vary depending on the reception conditions of GPS satellite signals. That is, in an environment (hereinafter referred to as a "strong electric field environment") where the received signal is a strong electric field signal, a correlation value tends to increase relatively as compared to an environment (hereinafter referred to as a "weak electric field environment") where the received signal is a weak electric field signal.

As a result, in particular, in a strong electric field environment, even when a GPS satellite assumed to be an acquisition target is different from an actual GPS satellite, the correlation value may have some large value. In this case, if it is determined that a correlation (acquisition success) is achieved based on the fact that a peak value (hereinafter referred to as a "peak correlation value") of the correlation values exceeds a predetermined threshold value, a false correlation (cross correlation) occurs. In view of this problem, the present inventor has focused on a navigation message carried on a GPS satellite signal and devised a method of determining a cross correlation using the navigation message in a simple and appropriate manner.

FIG. 1 is a diagram illustrating a navigation message. A GPS satellite transmits a navigation message at a bit rate of 50 bps (bits per second). One navigation message is made up of one master frame, and one master frame is made up of 25 frames (first to 25th frames) of 1500 bits. Since the bit rate is 50 bps, it takes 20 ms to receive a 1-bit navigation message. Thus, it takes 30 seconds to receive one frame.

Each frame is made of 5 subframes (first to fifth subframes). The same information is stored in the respective frames of the first to third subframes, and different information is stored in the respective frames of the fourth and fifth subframes. Information of different pages of a navigation message is stored in the fourth and fifth subframes. Thus, in order to acquire a complete navigation message, it is necessary to receive 25 frames which are the master frame, which requires 12.5 minutes.

Each subframe is made up of 10 words (first to tenth word). The first word is called a telemetry word (TLM: TeLeMetry word) and is made up of an 8-bit synchronization pattern and a 14-bit message. The second word is called a hand over word (HOW: Hand Over Word) and contains time information (the time in seconds elapsed from the start of a week) called ZCOUNT and a subframe ID indicating the number of a subframe. Moreover, different information for each subframe is stored in the third to tenth words.

The present inventor has focused on the fact that information unique to each satellite is stored in the first to third subframes of each frame. Moreover, the present inventor thought that a cross correlation can be determined by using a data portion in which the unique information of each satellite is stored. When a cross correlation occurs, a navigation message of another navigation message rather than a navigation message of a satellite assumed by the GPS receiver may be decoded. Thus, when GPS satellite signals are acquired using a plurality of replica C/A codes, a correct correlation is achieved if the results of decoding thereof are different from each other, and a cross correlation can be determined if the decoding results thereof are the same. However, even when the cross correlation can be determined, it is not possible to know which acquisition is false.

In the following description, three determination methods will be described as an example of a method for determining a cross correlation. In the following description, a satellite from which the GPS receiver assumes that a GPS satellite signal is acquired will be defined as an "assumed acquisition satellite". That is, even when the GPS receiver has acquired a GPS satellite signal using a certain replica C/A code, it is not possible to know that the acquisition results are from a correct acquisition of a GPS satellite signal from the true GPS satellite. Thus, such a satellite will be distinguished from an acquisition satellite and will be referred to as the "assumed acquisition satellite".

In the present embodiment, a first decoding of decoding a navigation message carried on a GPS satellite signal using a first replica C/A code (corresponding to a first replica code) and a second decoding of decoding the navigation message using a second replica C/A code (corresponding to a second replica code) are executed. Moreover, the occurrence of a cross correlation is determined using the result of the first decoding and the result of the second decoding. In the present embodiment, it is assumed that the navigation message itself carried on the GPS satellite signal is uniquely correct data. Moreover, based on the consideration that although the navigation message itself is uniquely correct data, if a different replica C/A code is used, the data of a correct navigation message is not always obtained as a result of decoding, the result of the first decoding and the result of the second decoding are compared with each other to determine the occurrence of a cross correlation.

1-1. First Determination Method

The first determination method is a method of comparing a data stream obtained as the result of the first decoding with a data stream obtained as the result of the second decoding bit by bit to thereby determine a cross correlation. A data portion used for comparison within the navigation message described in FIG. 1 will be referred to as a "comparison data portion". Although the comparison data portion is a portion (the first to third subframes) in which information unique to each satellite is stored, in this example, the second subframe will be described as the comparison data portion.

Figure 2:
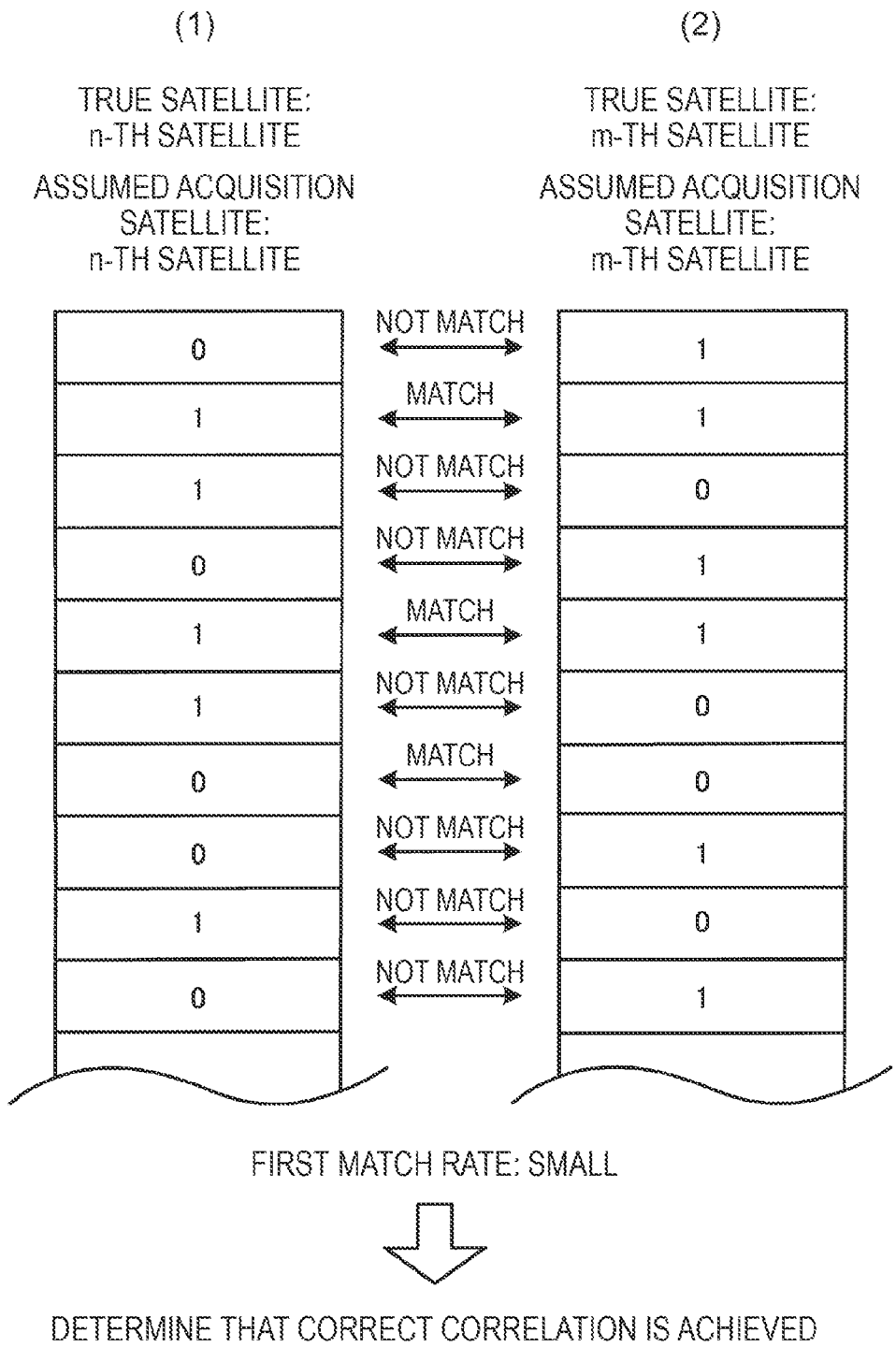
FIG. 2 is a diagram illustrating a first determination method.
Figure 3:
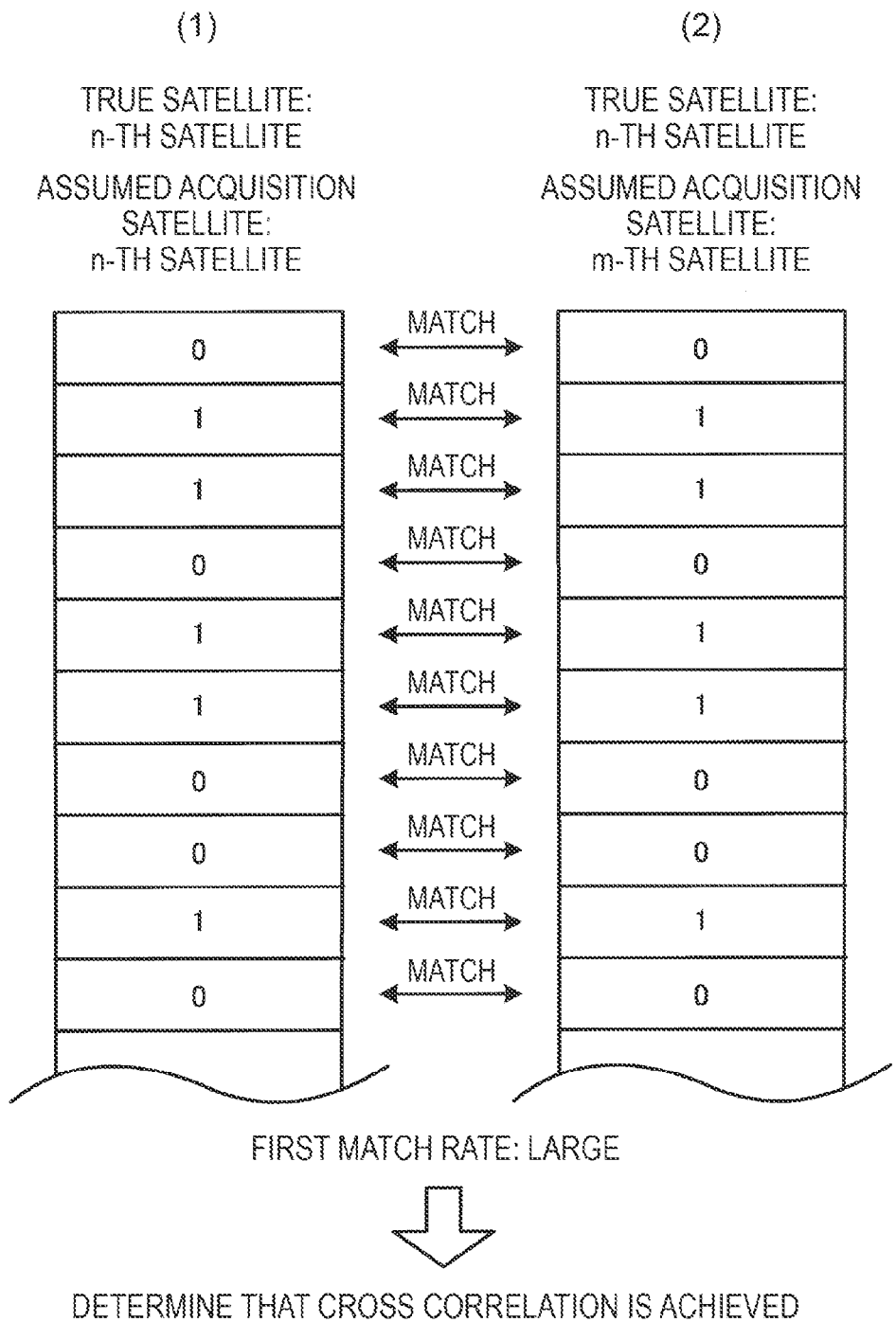
FIG. 3 is a diagram illustrating a first determination method.

FIG. 2 is a diagram illustrating a case where a correct correlation is determined, and FIG. 3 is a diagram illustrating a case where a cross correlation is determined. (1) in FIG. 2 shows a case where a true satellite is an "n-th satellite" and an assumed acquisition satellite is an "n-th satellite". Moreover, (2) in FIG. 2 shows a case where a true satellite is an "m-th satellite" and an assumed acquisition satellite is an "m-th satellite". In each case, the decoded data stream of the second subframe is illustrated. However, bit values are appropriately allocated.

In any of the cases in FIG. 2, the true satellite is identical to the assumed acquisition satellite. Since the contents of data stored in the second subframes of the n and m-th satellites are different, different data streams are decoded. Thus, when the two data streams are compared bit by bit, the match rate of bit values has a relatively low value. Here, the "match rate" as used herein means the proportion of the number of matching bits of which the values are compared and determined to match among the total number of bits subjected to comparison, and in the following description, will be referred to as a "first match rate".

Similarly to (1) in FIG. 2, (1) in FIG. 3 shows a case where a true satellite is an "n-th satellite" and an assumed acquisition satellite is an "n-th satellite". In contrast, (2) in FIG. 3 shows a case where a true satellite is an "n-th satellite" and an assumed acquisition satellite is an "m-th satellite". Similarly to FIG. 2, the decoded data stream of the second subframe is illustrated.

Since (1) in FIG. 3 is the same as (1) in FIG. 2, the same data stream as that of (1) in FIG. 2 is obtained. In contrast, in (2) in FIG. 3, the true satellite is not identical to the assumed acquisition satellite. In this case, the navigation message of the n-th satellite rather than the navigation message of the m-th satellite may be decoded. This may occur for the following reasons. That is, a correlation operation in a strong electric field environment will be considered, for example. In a correlation operation between a replica C/A code of the m-th satellite which is the assumed acquisition satellite and the received C/A code of the n-th satellite, the correlation value thereof may decrease. However, since the signal strength is strong, a correlation value of a predetermined value or more is obtained, and it is determined that a correlation is achieved. That is, a cross correlation occurs. If a correlation is achieved, the respective bit values of the navigation message can be decoded, whereby the navigation message of the n-th satellite is obtained.

Thus, when two data streams are compared bit by bit, since the bit values match for most bits, the first match rate has a high value. However, since the navigation message is decoded in the state of a cross correlation, decoding errors or data loss may occur. Thus, it cannot be said that the bit values match for all bits. However, when compared to the case of the correct correlation in FIG. 2, the first match rate increases in the case of the cross correlation in FIG. 3.

Thus, in the first determination method, the navigation message carried on the GPS satellite signal is decoded using different replica C/A codes, and data streams obtained as the results of the decoding are compared bit by bit. Moreover, a threshold determination is performed on the first match rate calculated as the result of the comparison, whereby it is determined that across correlation has occurred when the first match rate exceeds (or is equal to or larger than) a predetermined threshold.

1-2. Second Determination Method

The second determination method is a method of comparing the value of an ephemeris parameter obtained as the result of the first decoding with the value of an ephemeris parameter obtained as the result of the second decoding to thereby determine a cross correlation. The "ephemeris parameter" represents a parameter (ephemeris parameter) regarding the ephemeris which is an accurate ephemeris of a GPS satellite stored in the second and third subframes of the navigation message. The second determination method is one of the methods of comparing data storage portions of the ephemeris of a GPS satellite.

Figure 4:
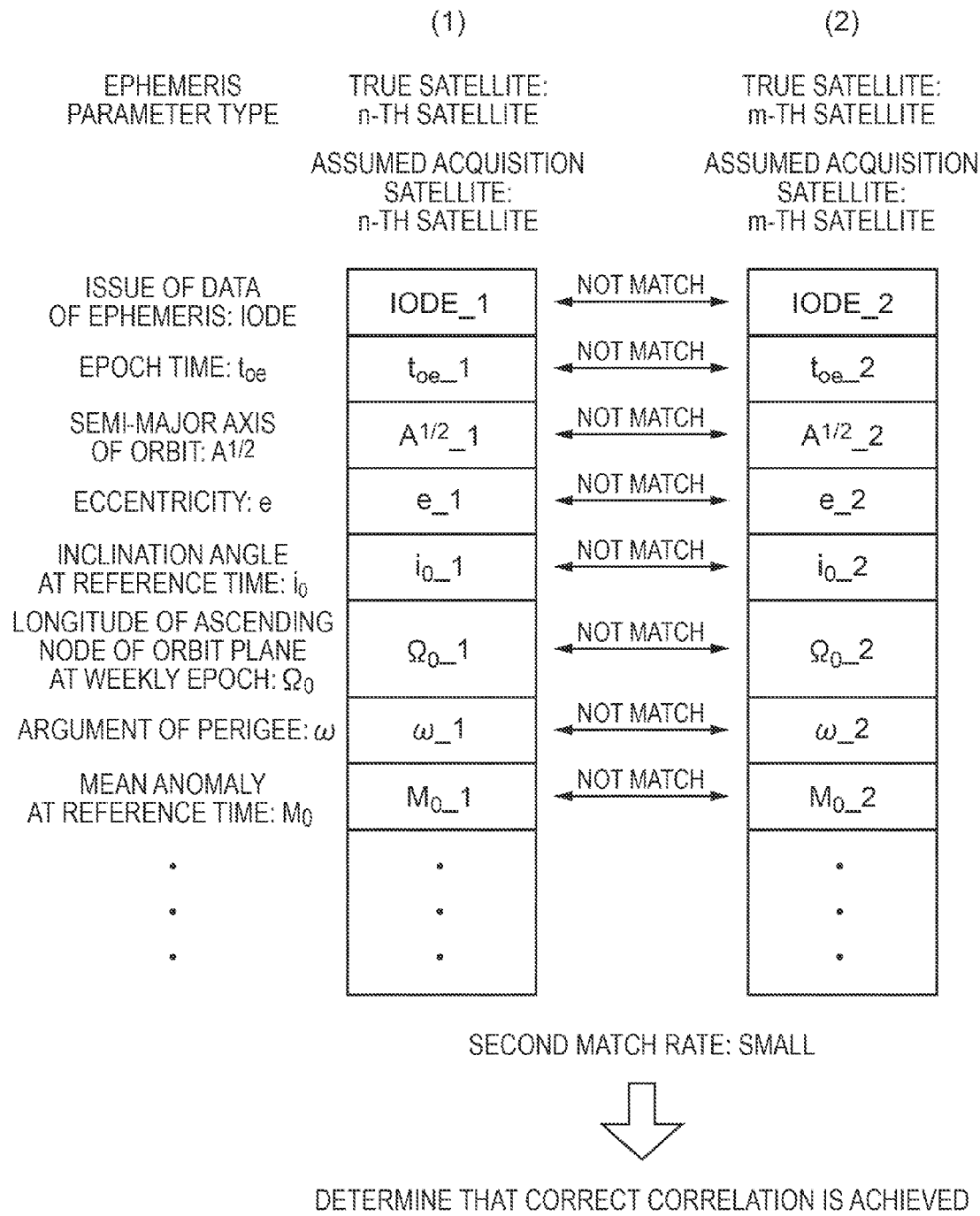
FIG. 4 is a diagram illustrating a second determination method.
Figure 5:
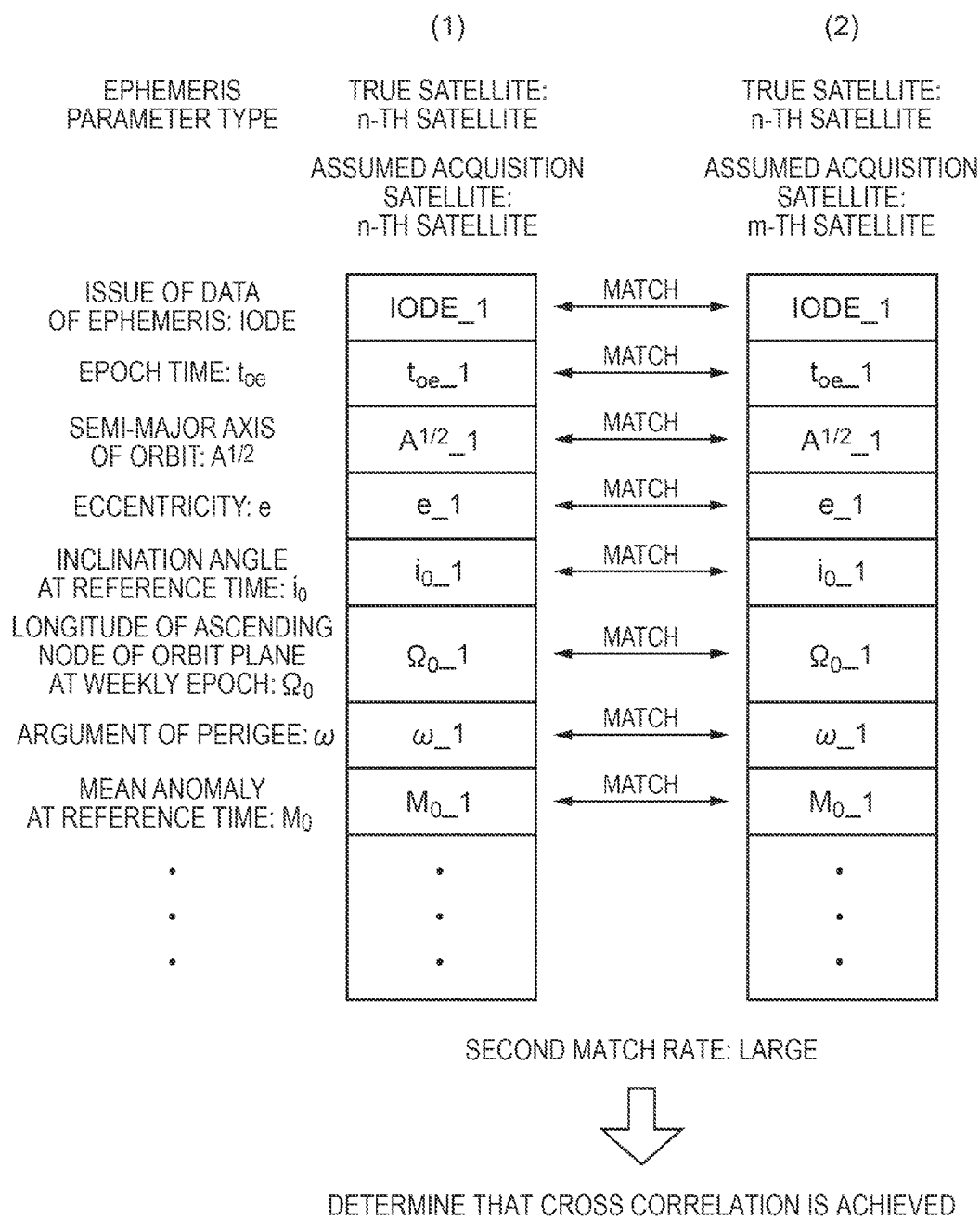
FIG. 5 is a diagram illustrating a second determination method.

FIG. 4 is a diagram illustrating a case where a correct correlation is determined, and FIG. 5 is a diagram illustrating a case where a cross correlation is determined. The perspectives of the respective drawings are the same as those of FIG. 2 and FIG. 3, and the types and values of the respective ephemeris parameters are illustrated instead of the data stream of the navigation message.

In FIG. 4, since the true satellite is identical to the assumed acquisition satellite, the n-th satellite and the m-th satellite have different values for a large number of ephemeris parameters. However, in the third determination method described later, the n-th satellite and the m-th satellite may also have the same values for some ephemeris parameters.

In this case, when the values of the ephemeris parameters are compared parameter by parameter, the match rate thereof will be relatively low. Here, the "match rate" as used herein means the proportion of the number of matching ephemeris parameters of which the values are compared and determined to match among the total number of ephemeris parameters subjected to comparison, and in the following description, will be referred to as a "second match rate".

In contrast, in (2) in FIG. 5, even when the true satellite is not identical to the assumed acquisition satellite, it is assumed that the GPS receiver receives the GPS satellite signal from the m-th satellite, in fact, the GPS receiver is receiving the GPS satellite signal from the n-th satellite. In this case, since the same values of the ephemeris parameters as the case of (1) in FIG. 5 are obtained, when the values of the ephemeris parameters are compared with each other, the second match rate may increase.

Thus, in the second determination method, the navigation message carried on the GPS satellite signal is decoded using different replica C/A codes, and the values of the ephemeris parameters obtained as the result of the decoding are compared with each other. Moreover, a threshold determination is performed on the second match rate calculated as the result of the comparison, whereby it is determined that a cross correlation has occurred when the second match rate exceeds (or is equal to or larger than) a predetermined threshold.

1-3. Third Determination Method

The third determination method is based on the same consideration as the second determination method but is a method of comparing some ephemeris parameters rather than all ephemeris parameters to thereby determine a cross correlation. The third determination method is one of the methods of comparing data storage portions of the ephemeris which is the ephemeris of a GPS satellite, similarly to the second determination method. In the third determination method, ephemeris parameters used for comparison will be described as "comparison parameters".

FIG. 6 is a diagram illustrating a method of selecting comparison parameters. In FIG. 6, among the ephemeris parameters, two parameters (hereinafter referred to as "ephemeris identification parameters") necessary for identifying the ephemeris and six parameters (hereinafter referred to as "satellite orbit parameters") known as Kepler's orbital elements are illustrated.

In the present embodiment, the issue of data of ephemeris "IODE" and the epoch time "$t_{oe}$" are defined as the ephemeris identification parameters. The semi-major axis of orbit "$A^{1/2}$", the eccentricity "e", the longitude of ascending node of orbit plane at weekly epoch "$\Omega_0$", the inclination angle at reference time "$i_0$", the argument of perigee "$\omega$", and the mean anomaly at reference time "$M_0$" are defined as the satellite orbit parameters.

The issue of data of ephemeris "IODE" is the issue number allocated to the ephemeris transmitted from a GPS satellite. The issue of data of ephemeris "IODE" corresponds to the number identifying the ephemeris and is stored in the second and third subframes. The epoch time "$t_{oe}$" is a parameter that defines the valid period of the ephemeris and is stored in the second subframe.

The semi-major axis of orbit "$A^{1/2}$" is the semi-major axis of a satellite orbit and is stored in the second subframe. The eccentricity "e" is a value indicating the degree of swelling of the ellipse of a satellite orbit and is stored in the second subframe. The longitude of the ascending node of the orbit plane at weekly epoch "$\Omega_0$" is the angle between a reference direction indicating the vernal equinoctial point and an ascending node and is stored in the third subframe. The inclination angle at reference time "$i_0$" is the angle between a satellite's orbit plane and an Earth's equatorial plane and is stored in the third subframe. The argument of perigee "w" is the angle between the ascending node and the perigee and is stored in the third subframe. Moreover, the mean anomaly at reference time "$M_0$" is a value used for convenience to designate the position of a satellite on the satellite orbit at a certain time. The mean anomaly at reference time "$M_0$" corresponds to a value designating the satellite position and is stored in the second subframe.

Among the satellite orbit parameters, the semi-major axis of orbit "$A^{1/2}$" and the eccentricity "e" are referred to as "orbital shape calculation parameters" since they are parameters necessary for calculating the shape of a satellite orbit. The longitude of ascending node of orbit plane at weekly epoch "$\Omega_0$", the inclination angle at reference time "$i_0$", and the argument of perigee "w" are referred to as "orbit plane calculation parameters" since they are parameters necessary for calculating an orbit plane of a satellite orbit. Moreover, the mean anomaly at reference time "$M_0$" is referred to as a "satellite position designation parameter" since it is a parameter necessary for designating the satellite position on a satellite orbit.

Now, cases will be classified into a case where two assumed acquisition satellites are on the same orbit and a case where they are on different orbits, and the suitability of using the respective ephemeris parameters in the comparison will be investigated. In principle, as for the issue of data of ephemeris "IODE", since different values are allocated to each satellite and to each ephemeris, the difference in the issue of data of ephemeris "IODE" between the satellites on the same orbit generally increases. Thus, it can be said that the issue of data of ephemeris "IODE" is suitable for comparison.

As for the epoch time "$t_{oe}$", in some cases, since the same values are stored for a plurality of satellites, it is not preferable to use this parameter solely for comparison. However, the epoch time "$t_{oe}$" is an essential parameter for identifying the ephemeris together with the issue of data of ephemeris "IODE". Taking this into consideration, it can be said that the epoch time "$t_{oe}$" can be used for comparison in combination with the issue of data of ephemeris "IODE".

Next, as for the orbital shape calculation parameters and the orbit plane calculation parameters, since the same values are allocated to the satellites on the same orbit, or if the two values are different, the difference thereof is very small, these parameters are not suitable for comparison. However, as for the mean anomaly at reference time "$M_0$" which is the satellite position designation parameter, since different values are allocated to the satellites on the same orbit, it is possible to distinguish satellites on the same orbit. Thus, among Kepler's six orbital elements, the mean anomaly at reference time "$M_0$" can be said to be suitable for comparison.

When such a consideration is applied to the case where two assumed acquisition satellites are on different orbits, the satellites on different orbits have different orbital shape calculation parameters and different orbit plane calculation parameters. Thus, it can be said that in addition to the issue of data of ephemeris "IODE", the epoch time "$t_{oe}$", and the mean anomaly at reference time "$M_0$", the semi-major axis of orbit "$A^{1/2}$", the eccentricity "e", the longitude of ascending node of orbit plane at weekly epoch "$\Omega_0$", the inclination angle at reference time "$i_0$", and the argument of perigee "$\omega$" can be used for comparison.

In the present embodiment, assuming that a cross correlation may occur between satellites on the same orbit and a cross correlation may occur between satellites on different orbits, at least the issue of data of ephemeris "IODE" or the mean anomaly at reference time "$M_0$" is selected as the comparison parameter. That is, three combinations of (1) only the issue of data of ephemeris "IODE", (2) only the mean anomaly at reference time "$M_0$", and (3) the issue of data of ephemeris "IODE" and the mean anomaly at reference time "$M_0$" can be considered as a variation of the comparison parameter.

For example, when the comparison is performed using the combination of (3) the issue of data of ephemeris "IODE" and the mean anomaly at reference time "$M_0$", the issue of data of ephemeris "IODE" obtained as the result of the first decoding and the issue of data of ephemeris "IODE" obtained as the result of the second decoding are compared with each other. Moreover, the mean anomaly at reference time "$M_0$" obtained as the result of the first decoding and the mean anomaly at reference time "$M_0$" obtained as the result of the second decoding are compared with each other. As the result of the comparison, if the values of any of the two comparison parameters, for example, match each other, it is determined that a cross correlation occurs.

In a modified example described later, it may be determined whether two assumed acquisition satellites are on the same orbit or on different orbits and parameters used for comparison may be changed based on the determination result. Since a combination of satellites on the same orbit is known, it is possible to determine whether the assumed acquisition satellite and the comparison satellite are on the same orbit or on different orbits based on a satellite number of the assumed acquisition satellite and a satellite number of the comparison satellite.

In this case, a "same orbit comparison parameter" which is a comparison parameter for satellites on the same satellite and a "different orbit comparison parameter" which is a comparison parameter for satellites on different satellites may be determined individually. For example, the same orbit comparison parameter is determined as any one of the combinations of (1) the issue of data of ephemeris "IODE", (2) the mean anomaly at reference time "$M_0$", and (3) the issue of data of ephemeris "IODE" and the mean anomaly at reference time "$M_0$". Moreover, the different orbit comparison program is determined as anyone of combinations in which the longitude of ascending node of orbit plane at weekly epoch "$\Omega_0$" which is one kind of orbit plane calculation parameter, for example, is added to the combinations of (1) to (3).

Moreover, it may be determined whether two assumed acquisition satellites are on the same orbit or on different orbits. When the two assumed acquisition satellites are on the same orbit, comparison may be performed using the "same orbit comparison parameter". When the two assumed acquisition satellites are on different orbits, comparison may be performed using the "different orbit comparison parameter".

2. Embodiments

Next, an embodiment of a cross correlation determination device that performs cross correlation determination in accordance with the principle described above will be described. In this example, an embodiment when the invention is applied to a mobile phone as an example of an electronic apparatus having the cross correlation determination device will be described. However, the embodiments to which the invention can be applied is not limited to the embodiment described below.

2-1. Functional Configuration of Mobile Phone

Figure 7:
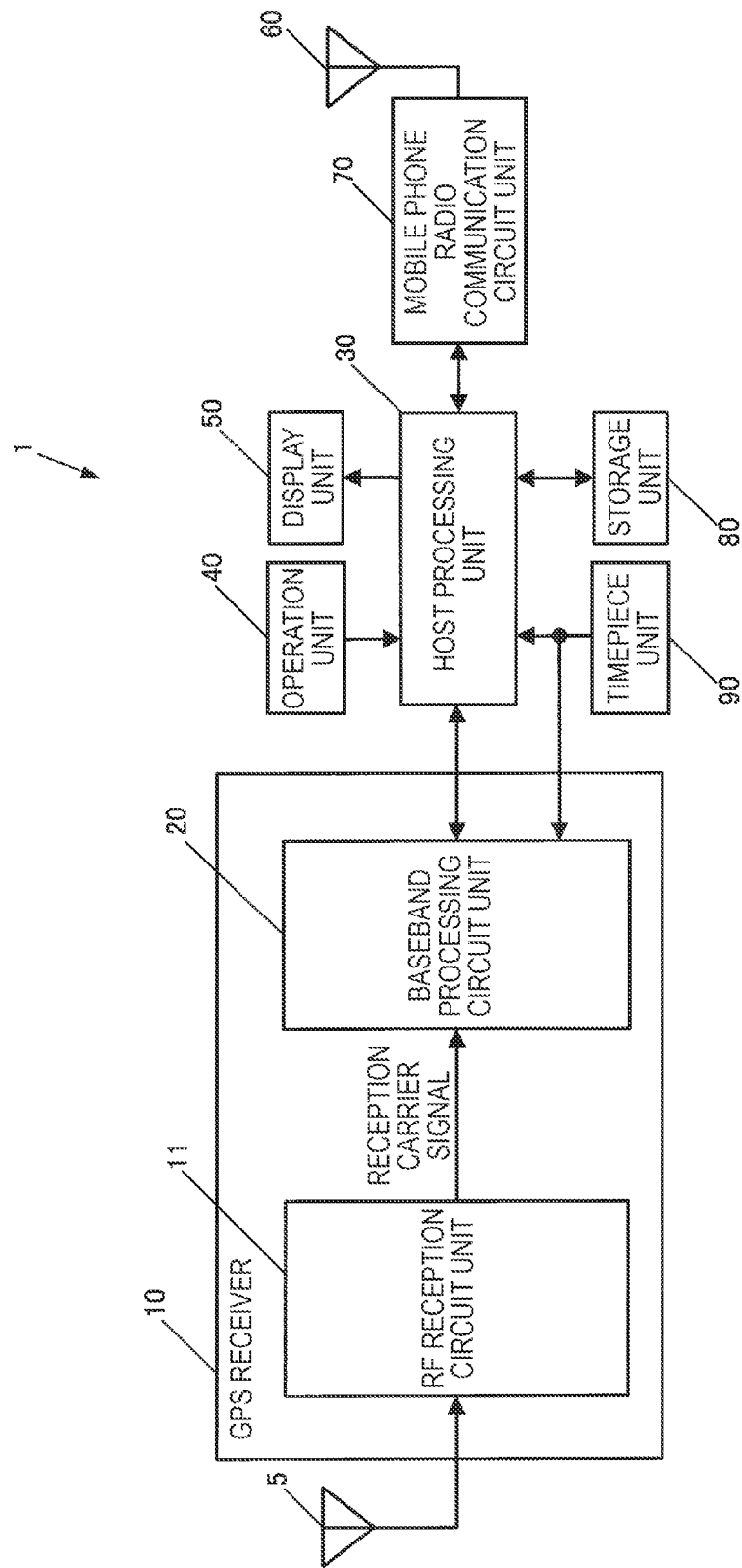
FIG. 7 is a block diagram showing an example of a functional configuration of a mobile phone.

FIG. 7 is a block diagram showing an example of a functional configuration of a mobile phone 1 according to the present embodiment. The mobile phone 1 includes a GPS antenna 5, a GPS reception unit 10, a host processing unit 30, an operation unit 40, a display unit 50, a mobile phone antenna 60, a mobile phone radio communication circuit unit 70, a storage unit 80, and a timepiece unit 90.

The GPS antenna 5 is an antenna that receives an RF (Radio Frequency) signal including a GPS satellite signal transmitted from a GPS satellite and outputs a reception signal to the GPS reception unit 10.

The GPS reception unit 10 is a position calculation circuit or a position calculation device that measures the position of the mobile phone 1 based on a signal output from the GPS antenna 5 and is a functional block corresponding to a so-called GPS receiver. The GPS reception unit 10 includes an RF reception circuit unit 11 and a baseband processing circuit unit 20. The RF reception circuit unit 11 and the baseband processing circuit unit 20 can be manufactured as individual LSIs (Large Scale Integration) and can be manufactured as a single chip.

The RF reception circuit unit 11 is an RF signal reception circuit. The RF reception circuit unit 11 may be configured as a reception circuit that converts the RF signal output from the GPS antenna 5 into a digital signal using an A/D converter and processes the digital signal. Moreover, the RF reception circuit unit 11 may be configured as a circuit that processes the analog RF signal output from the GPS antenna 5, finally converts the processed analog RF signal into a digital signal, and outputs the digital signal to the baseband processing circuit unit 20.

In the latter case, the RF reception circuit unit 11 can be configured as follows. That is, a predetermined oscillation signal is divided or multiplied to thereby generate an oscillation signal for multiplication of the RF signal. The generated oscillation signal is multiplied to the RF signal output from the GPS antenna 5, whereby the RF signal is down-converted into an intermediate-frequency signal (hereinafter referred to as an "IF (Intermediate Frequency) signal"). The IF signal is converted into a digital signal by an A/D converter after subjecting the IF signal to amplification and the like, and the digital signal is output to the baseband processing circuit unit 20.

The baseband processing circuit unit 20 is a processing circuit block that performs a correlation process or the like on the reception signal output from the RF reception circuit unit 11 to acquire a GPS satellite signal and performs a predetermined position calculation computation based on the satellite orbit data, time data, and the like extracted from the GPS satellite signal to calculate the position (position coordinate) of the mobile phone 1.

In the present embodiment, the baseband processing circuit unit 20 functions as a cross correlation determination device. More specifically, the baseband processing circuit unit 20 functions as a decoding unit that executes the first decoding of decoding the navigation message carried on the GPS satellite signal using the first replica C/A code and the second decoding of decoding the navigation message using the second replica C/A code. Moreover, the baseband processing circuit unit 20 functions as a determination unit that determines the occurrence of across correlation using the result of the first decoding and the result of the second decoding.

The host processing unit 30 is a processor that controls the overall operation of the respective units of the mobile phone 1 in accordance with various programs such as a system program stored in the storage unit 80. The host processing unit 30 displays a map indicating the current position on the display unit 50 based on the position coordinates acquired from the baseband processing circuit unit 20 and uses the position coordinates in the processing of various applications.

The operation unit 40 is an input device which includes a touch panel, button switches, and the like, for example, and outputs signals corresponding to pressed keys or buttons to the host processing unit 30. Various instructions such as a call request, an email transmission/reception request, or a position calculation request are input in accordance with the operation on the operation unit 40.

The display unit 50 is a display device which is configured by an LCD (Liquid Crystal Display) or the like and performs various display operations based on a display signal input from the host processing unit 30. A position display screen, time information, and the like are displayed on the display unit 50.

The mobile phone antenna 60 is an antenna that transmits and receives radio signals for mobile phones to and from a wireless base station installed by a communication service provider of the mobile phone 1.

The mobile phone radio communication circuit unit 70 is a communication circuit unit for mobile phones which includes an RF conversion circuit, a baseband processing circuit, and the like, and performs modulation and demodulation of radio signals for mobile phones to thereby realize transmission and reception of calls and emails.

The storage unit 80 is a storage device that stores a system program allowing the host processing unit 30 to control the mobile phone 1 and various programs, data, and the like for executing the processing of various applications.

The timepiece unit 90 is an internal timepiece of the mobile phone 1 and includes an oscillation circuit such as a quartz crystal oscillator. The time measured by the timepiece unit 90 is output to the baseband processing circuit unit 20 and the host processing unit 30 as needed.

2-2. Circuit Configuration of Baseband Processing Circuit Unit

Figure 8:
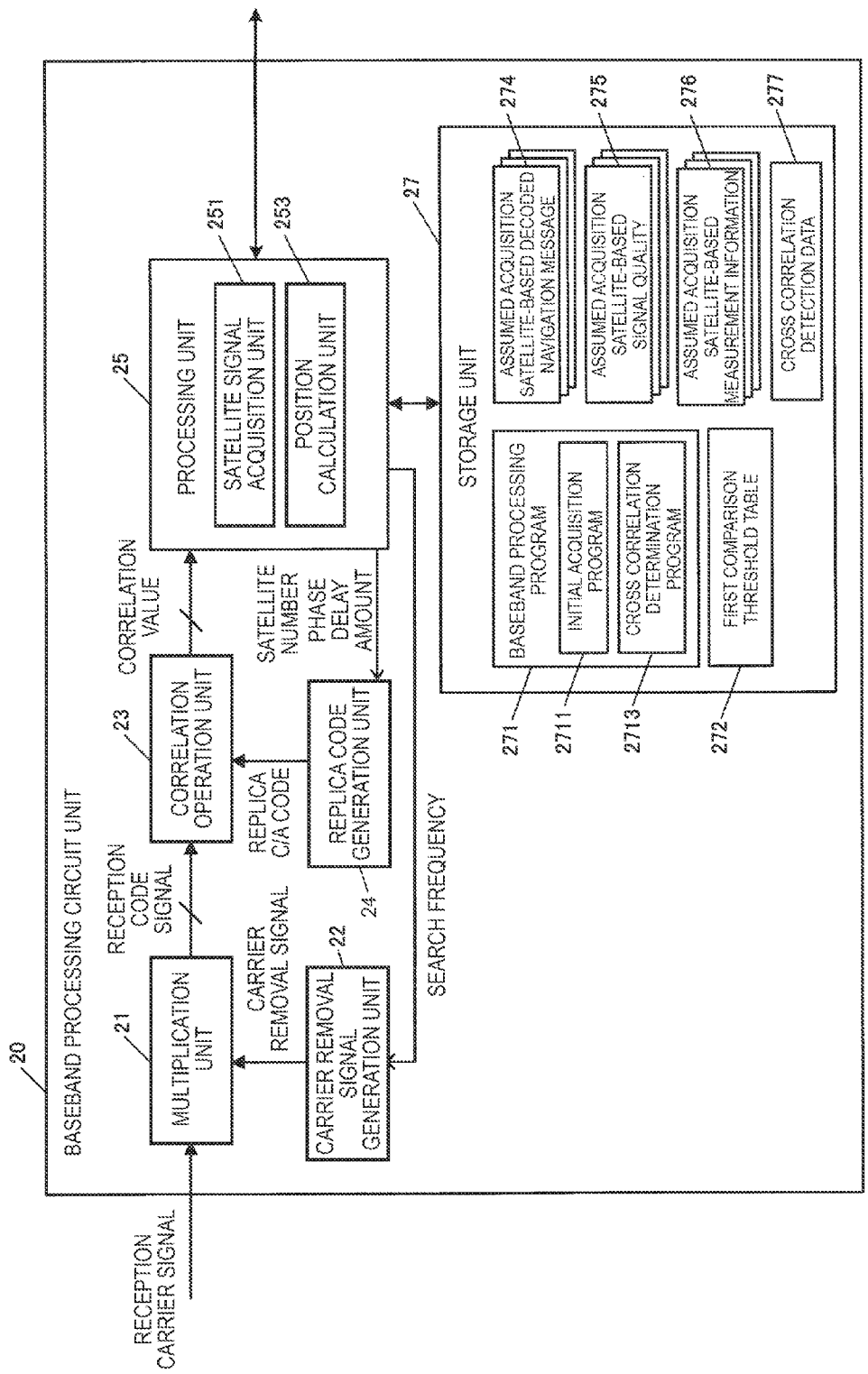
FIG. 8 is a diagram showing an example of a circuit configuration of a baseband processing circuit unit.

FIG. 8 is a diagram showing an example of a circuit configuration of the baseband processing circuit unit 20, mainly showing circuit blocks associated with the present embodiment. The baseband processing circuit unit 20 includes, for example, a multiplication unit 21, a carrier removal signal generation unit 22, a correlation operation unit 23, a replica code generation unit 24, a processing unit 25, and a storage unit 27.

The multiplication unit 21 is a circuit unit that multiplies a carrier removal signal generated by the carrier removal signal generation unit 22 to reception carrier signals which are I and Q-phase reception signals to thereby remove a carrier (carrier wave) from the reception carrier signals, and includes a multiplier or the like. The carrier removal signal generation unit 22 generates a carrier removal signal corresponding to a search frequency instructed from the processing unit 25 and outputs the carrier removal signal to the multiplication unit 21.

Although a circuit block that performs separation (IQ separation) of I and Q components of the reception signals is not illustrated, when the RF reception circuit unit 11 down-converts the reception signals into an IF signal, the IQ separation may be performed by multiplying local oscillation signals having a phase difference of 90° to the reception signals. Moreover, when the signal output from the RF reception circuit unit 11 is an IF signal, a carrier removal signal of the IF frequency may be generated. As above, the present embodiment can be substantially equally applied even to when the RF reception circuit unit 11 down-converts the reception signal into an IF signal.

The carrier removal signal generation unit 22 is a circuit that generates a carrier removal signal of the same frequency as the frequency of the carrier signal of the GPS satellite signal and includes an oscillator such as a carrier NCO (Numerical Controlled Oscillator). When the reception carrier signal is an IF signal, the carrier removal signal generation unit 22 generates a signal of the IF frequency. The carrier removal signal generation unit 22 generates an I-phase carrier removal signal for the I-phase reception signal and a Q-phase carrier removal signal for the Q-phase reception signal and outputs the carrier removal signals to the multiplication unit 21. The Q-phase carrier removal signal is a signal in which the difference in phase from the I-phase carrier removal signal is 90°.

When the carrier removal signals generated by the carrier removal signal generation unit 22 are multiplied to the reception carrier signals by the multiplication unit 21, demodulation (detection) is performed, whereby a reception code signal from which carriers are removed is generated and output. That is, in the multiplication unit 21, the I-phase carrier removal signal is multiplied to the I-phase reception signal, whereby an I-phase reception code signal is demodulated, and the Q-phase carrier removal signal is multiplied to the Q-phase reception signal, whereby a Q-phase reception code signal is demodulated. The multiplication unit 21 and the carrier removal signal generation unit 22 can be referred to as a demodulation unit (detection unit).

The correlation operation unit 23 is a circuit unit that performs a correlation operation between the I and Q-phase reception code signals output from the multiplication unit 21 and the replica C/A codes generated by the replica code generation unit 24 and includes a plurality of correlators and the like.

The replica code generation unit 24 is a circuit unit that generates a replica C/A code which is a simulated replica of a C/A code and includes an oscillator such as a code NCO. The replica code generation unit 24 generates a replica C/A code corresponding to a satellite number and a phase delay amount instructed from the processing unit 25 and outputs the replica C/A code to the correlation operation unit 23. The correlation operation unit 23 performs a correlation operation between each of the I and Q-phase reception code signals and the replica C/A code generated by the replica code generation unit 24.

The processing unit 25 is a control device and an arithmetic device that controls an overall operation of the respective functional units of the baseband processing circuit unit 20 and includes a processor such as a CPU (Central Processing Unit). The processing unit 25 includes a satellite signal acquisition unit 251 and a position calculation unit 253 as its main functional units.

The satellite signal acquisition unit 251 performs a peak determination on the results (correlation values) of the correlation operations in the frequency direction and the phase direction output from the correlation operation unit 23 to thereby detect the frequency (reception frequency) of the reception carrier signal and the phase (code phase) of the reception C/A code. Moreover, the satellite signal acquisition unit 251 stores the detected reception frequency and the code phase in the storage unit 27 as measurement information and uses the measurement information in calculation of position and the like. Moreover, the satellite signal acquisition unit 251 decodes a navigation message based on the correlation values output from the correlation operation unit 23, stores the navigation message in the storage unit 27, and uses the navigation message in a cross correlation determination, calculation of position, and the like.

When the phase (carrier phase) of the reception carrier signal and the phase (code phase) of the reception C/A code are detected, and a correlation is achieved, the values of respective bits of the navigation message are obtained based on a change over time in the correlation values. This phase synchronization is realized by a PLL (Phase Locked Loop) known as a phase lock loop, for example, and data bits of the navigation message are decoded from a change over time in the correlation values with respect to the I-phase reception code signal.

The position calculation unit 253 performs a well-known position calculation computation using the measurement information acquired for each acquisition satellite by the satellite signal acquisition unit 251 and the navigation message decoded for each acquisition satellite to thereby calculate the position of the mobile phone 1. The calculated position is output to the host processing unit 30 and used for various applications.

The storage unit 27 is configured by a storage device (memory) such as a ROM (Read Only Memory), a flash ROM, or a RAM (Random Access Memory) and stores the system program of the baseband processing circuit unit 20 and various programs, data, and the like for realizing various functions such as a satellite signal acquisition function or a position calculation function. Moreover, the storage unit 27 includes a work area for temporarily storing data under processing for various processes, processing results, and the like.

As shown in FIG. 8, in the storage unit 27, a baseband processing program 271 which is read by the processing unit 25 and executed as a baseband processing (see FIG. 11) is stored as a program. Moreover, the baseband processing program 271 includes, as its subroutine, an initial acquisition program 2711 executed as an initial acquisition process (see FIG. 12) and various cross correlation determination programs 2713 executed as various cross correlation determination processes (see FIGS. 13 to 17).

The baseband processing is a process in which the processing unit 25 performs an initial acquisition process of acquiring a satellite signal for the first time after the mobile phone 1 is powered on and a normal acquisition process of acquiring a satellite signal for the second time and later after the power-on to thereby acquire a GPS satellite signal and calculates the position of the mobile phone 1 using the acquired GPS satellite signal.

The cross correlation determination process is a process in which the satellite signal acquisition unit 251 determines a cross correlation using various determination methods described in the "1. Principle" section. These processes will be described in detail with reference to flowcharts.

In the storage unit 27, a first comparison threshold table 272, an assumed acquisition satellite-based decoded navigation message 274, an assumed acquisition satellite-based signal quality 275, assumed acquisition satellite-based measurement information 276, and cross correlation determination data 277 are stored as data.

Figure 9:
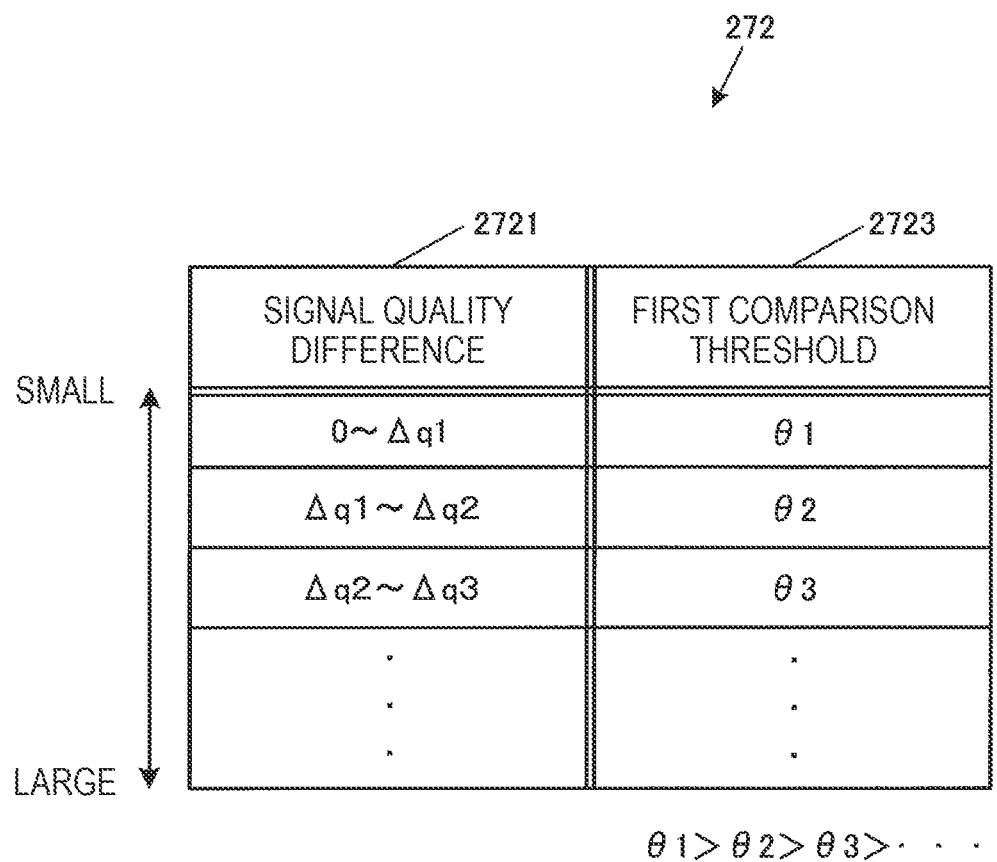
FIG. 9 is a diagram showing an example of a table configuration of a first comparison threshold table.

The first comparison threshold table 272 is a table in which a threshold value (hereinafter referred to as a "first comparison threshold") for the first match rate is defined, and an example of the table configuration is shown in FIG. 9. In the first comparison threshold table 272, a signal quality difference 2721 and a first comparison threshold 2723 are stored in a correlated manner.

The signal quality difference 2721 is a difference between a signal quality of a signal in which a GPS satellite signal is acquired for a certain assumed acquisition satellite and a signal quality of a signal in which a GPS satellite signal is acquired for another assumed acquisition satellite. Although the signal quality can be calculated by various calculation formulas, in the present embodiment, a SN ratio (SNR: Signal to Noise Ratio) is calculated in accordance with Equation (1) below.

$$SNR = P_S/P_N \quad (1)$$

Here, "$P_S$" is a peak correlation value, and "$P_N$" is a correlation value (hereinafter referred to as a "noise floor correlation value") at a phase separated by a predetermined phase (for example, 1 chip) from a peak phase.

Since there are various other methods for calculating the SN ratio, the SN ratio may be calculated by other methods.

If a correlation is correctly achieved (correct correlation), the peak correlation value "$P_S$" increases and the noise floor correlation value "$P_N$" unlimitedly approaches zero. That is, the SNR tends to increase as the acquisition of the GPS satellite signal is performed more accurately. Thus, it can be said that the signal quality of an acquisition signal increases as the SNR has a higher value.

In the present embodiment, the first comparison threshold 2723 is changed based on the signal quality difference 2721 between the signal quality of the assumed acquisition satellite and the signal quality of a satellite (hereinafter referred to as a "comparison satellite") used for comparison with the assumed acquisition satellite. Referring to the first comparison threshold table 272 in FIG. 9, a smaller value is set as the first comparison threshold 2723 as the signal quality difference 2721 increases.

When the signal quality of one acquisition signal is high and the signal quality of the other acquisition signal is low, the difference in signal quality increases. If the signal quality of an acquisition signal is high, the possibility of the navigation message to be correctly decoded increases. However, if the signal quality of the acquisition signal is low, the possibility of decoding errors to occur increases. Thus, when the navigation messages decoded in this case are compared with each other, the match rate (the first match rate) tends to decrease.

Thus, in the present embodiment, the cross correlation determination criteria are lowered by setting the first comparison threshold 2723 to a smaller value as the difference in signal quality increases. Lowering the cross correlation determination criteria makes it easy to determine that a cross correlation has occurred. In contrast, when the difference in signal quality is small, the first comparison threshold 2723 is set to a large value to make the cross correlation determination criteria stricter. That is, it is made hard to determine that a cross correlation has occurred.

The assumed acquisition satellite-based decoded navigation message 274 is data in which the navigation message decoded from the acquisition signal of the GPS satellite signal is stored for each assumed acquisition satellite. The assumed acquisition satellite-based signal quality 275 is data in which the signal quality of the acquisition signal of the GPS satellite signal is stored for each assumed acquisition satellite.

The assumed acquisition satellite-based measurement information 276 is data in which the measurement information of the acquired GPS satellite signal is stored for each assumed acquisition satellite. That is, the information on the reception frequency and the code phase is stored as the measurement information for each assumed acquisition satellite.

The cross correlation determination data 277 is data for determining whether a cross correlation has occurred or not with respect to all satellites in which a correlation is achieved. An example of the data configuration is shown in FIG. 10. The cross correlation determination data 277 is data of the combinations of assumed acquisition satellites to be compared, in which a classification of a correct correlation or a cross correlation is stored for each combination of a certain assumed acquisition satellite (subject satellite) and other assumed acquisition satellite (other satellite).

In the present embodiment, in the cross correlation determination, a navigation message which is acquired and decoded for a certain assumed acquisition satellite (subject satellite) is compared with a navigation message which is acquired and decoded for another assumed acquisition satellite (another satellite). As a result, when it is determined that a cross correlation has occurred, a satellite in which the signal quality of the acquisition signal (reception signal) is lower among the subject satellite and the other satellite is determined to be a "false acquisition satellite". This is because a GPS satellite signal acquired by a cross correlation generally has a low signal quality.

In the cross correlation determination data 277, "correct" is stored in the combination of satellites in which it is determined that a correct correlation is achieved. Moreover, "false" is stored in the combination of satellites in which it is determined that across correlation is achieved, and the type ("subject" or "other") of the false acquisition satellite is also stored.

2-3. Flow of Processing

Figure 11:
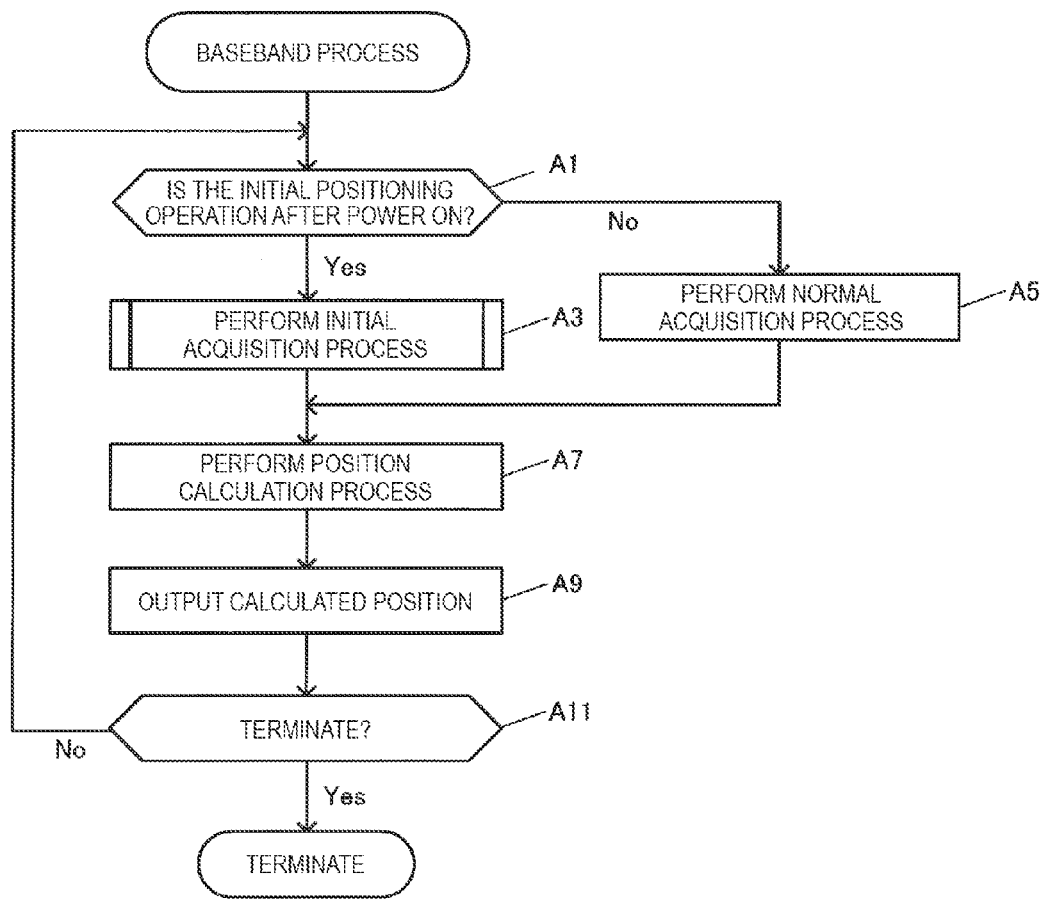
FIG. 11 is a flowchart showing the flow of baseband processing.

FIG. 11 is a flowchart showing the flow of baseband processing which is executed by the baseband processing circuit unit 20 when the baseband processing program 271 stored in the storage unit 27 is read by the processing unit 25.

First, the satellite signal acquisition unit 251 determines whether the present positioning operation is the initial positioning operation after power-on (step A1). When it is determined that the present positioning operation is the initial positioning operation (step A1: Yes), the satellite signal acquisition unit 251 reads and executes the initial acquisition program 2711 to thereby perform the initial acquisition process (step A3).

Figure 12:
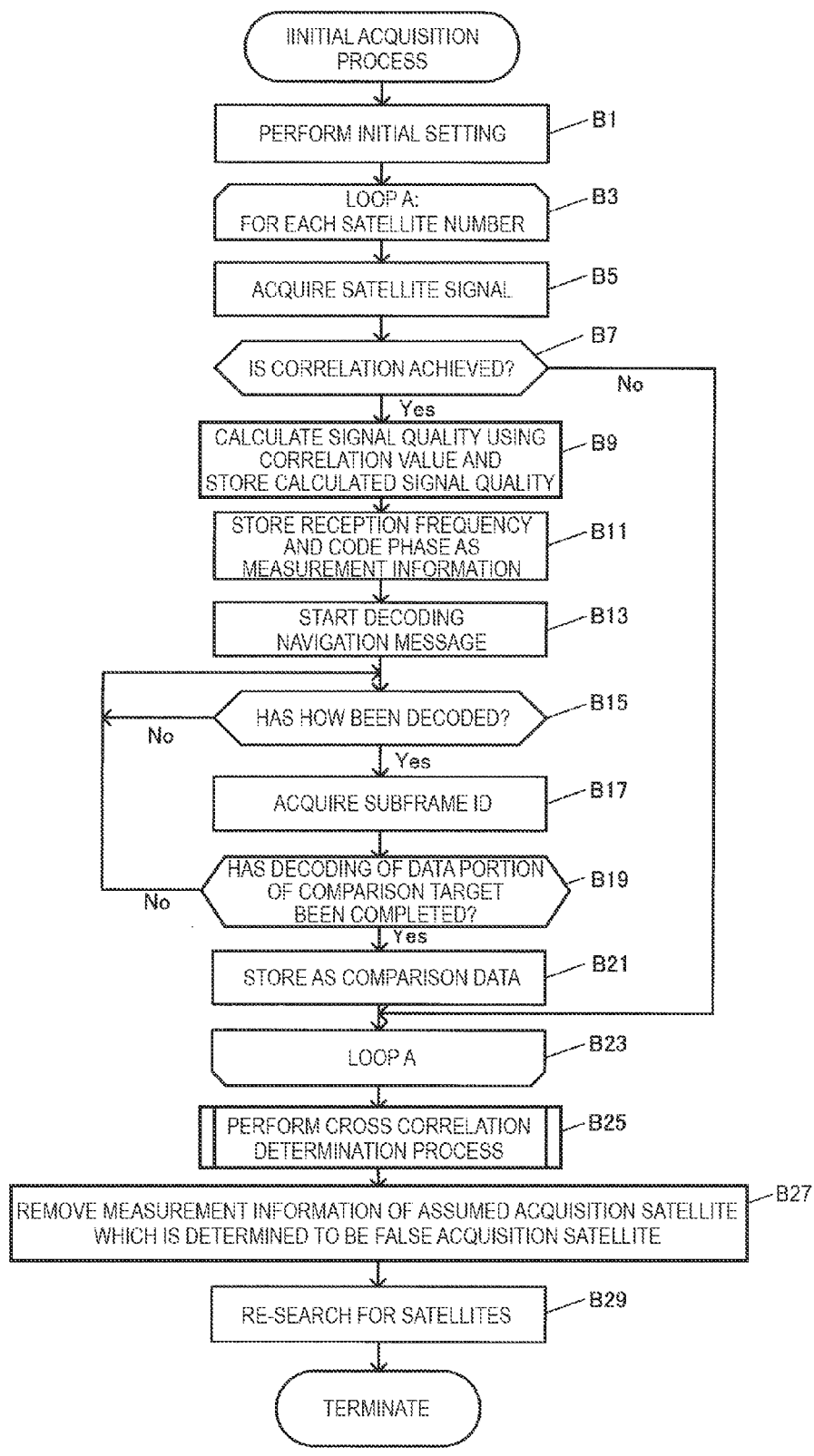
FIG. 12 is a flowchart showing the flow of an initial acquisition process.

FIG. 12 is a flowchart showing the flow of the initial acquisition process.

First, the satellite signal acquisition unit 251 performs initial settings (step B1). Specifically, the satellite signal acquisition unit 251 sets a frequency search range for a GPS satellite signal. More specifically, a range of predetermined width (for example, ±10 kHz) around the center of a certain central search frequency (for example, a prescribed carrier frequency after intermediate frequency conversion) is set as the frequency search range.

Subsequently, the satellite signal acquisition unit 251 executes the processes of loop A with respect to respective satellite numbers (steps B3 to B23). In the processes of loop A, the satellite signal acquisition unit 251 acquires a GPS satellite signal using a replica C/A code of the corresponding satellite number (step B5).

Specifically, the satellite signal acquisition unit 251 causes the carrier removal signal generation unit 22 to generate a carrier removal signal while changing the search frequency within the frequency search range set in step B1 and causes the multiplication unit 21 to remove carriers from the reception carrier signal. Moreover, the satellite signal acquisition unit 251 causes the replica code generation unit 24 to generate a replica C/A code of the corresponding satellite number and causes the correlation operation unit 23 to perform a correlation operation while changing a phase delay amount.

Subsequently, the satellite signal acquisition unit 251 determines whether a correlation is achieved (step B7). That is, it is determined that a correlation is achieved when a peak correlation value which is the largest correlation value among the correlation values at respective phase delay amounts output from the correlation operation unit 23 exceeds (or is equal to or larger than) a predetermined threshold value. Moreover, when it is determined that a correlation is not achieved (step B7: No), the process proceeds to the next satellite number.

In contrast, when it is determined that a correlation is achieved (step B7: Yes), the satellite signal acquisition unit 251 calculates the SNR in accordance with Equation (1), for example, as the signal quality of the acquisition signal and stores the calculated SNR in the assumed acquisition satellite-based signal quality 275 of the storage unit 27 (step B9).

Subsequently, the satellite signal acquisition unit 251 stores the frequency (reception frequency) of the carrier removal signal and the phase (code phase) of the replica C/A code corresponding to the peak correlation value in the assumed acquisition satellite-based measurement information 276 of the storage unit 27 as the measurement information (step B11).

Moreover, the satellite signal acquisition unit 251 starts decoding the navigation message based on the correlation values output from the correlation operation unit 23 and stores the decoded navigation message in the storage unit 27 as the assumed acquisition satellite-based decoded navigation message 274 (step B13). After that, a standby is performed until a hand over word (HOW) is decoded (step B15: No). When the HOW is decoded (step B15: Yes), a subframe ID stored in the HOW is acquired (step B17).

Subsequently, the satellite signal acquisition unit 251 determines whether decoding of data portions to be compared has been completed (step B19). When it is determined that the decoding has not been completed (step B19: No), the flow returns to step B15. Moreover, when it is determined that the decoding has been completed (step B19: Yes), the satellite signal acquisition unit 251 temporarily stores the decoded navigation message in the storage unit 27 as comparison data (step B21), and the process proceeds to the next satellite number.

When the processes of steps B5 to B21 have been performed for all satellite numbers, the satellite signal acquisition unit 251 terminates the processes of loop A (step B23). After that, the satellite signal acquisition unit 251 performs a cross correlation determination process in accordance with the cross correlation determination program 2713 stored in the storage unit 27 (step B25).

Figure 13:
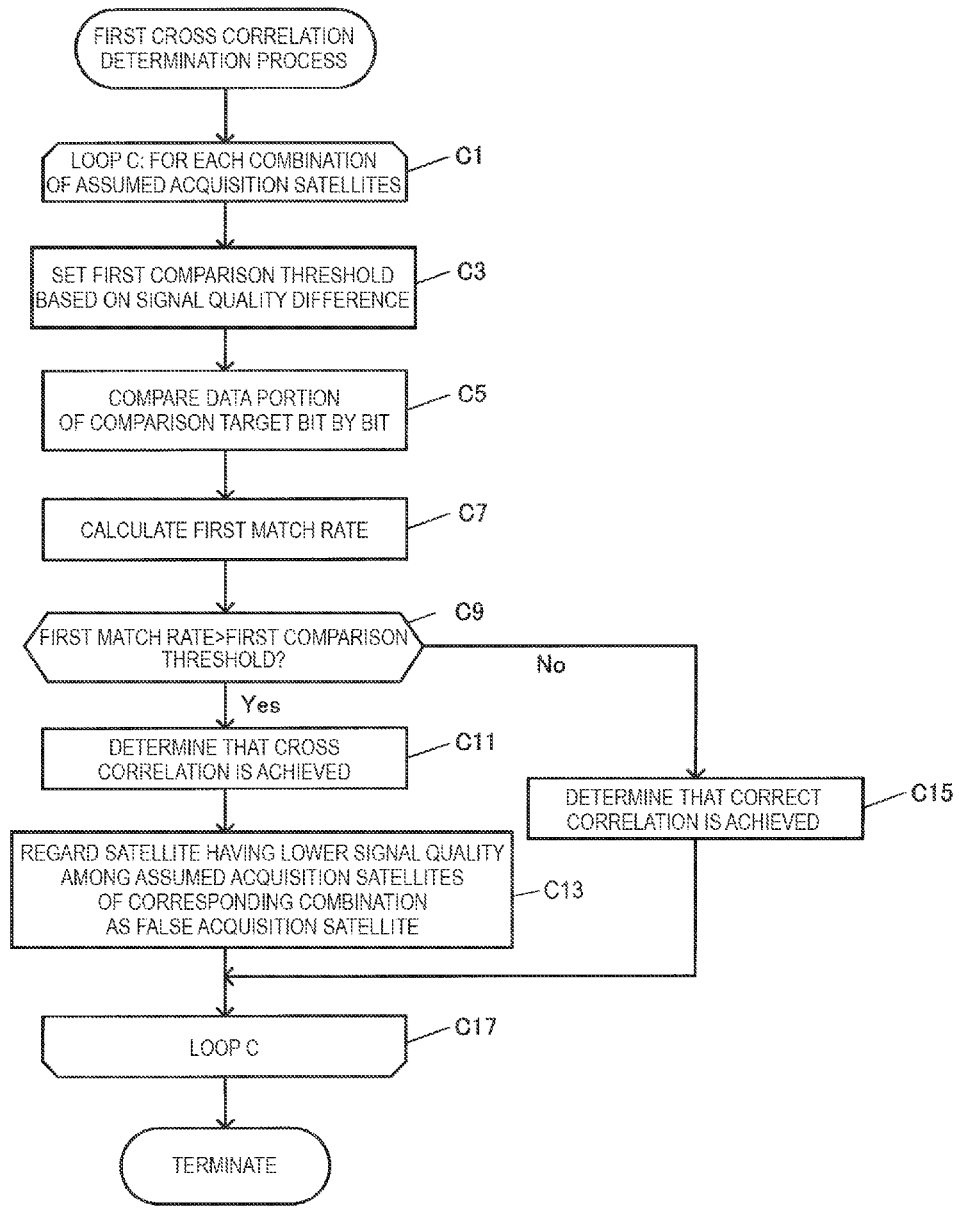
FIG. 13 is a flowchart showing the flow of a first cross correlation determination process.

FIG. 13 is a flowchart showing the flow of a first cross correlation determination process which is an example of the cross correlation determination process. The first cross correlation determination process is a process corresponding to the first determination method.

First, the satellite signal acquisition unit 251 performs the processes of loop C for each combination of two assumed acquisition satellites to be compared (steps C1 to C17). In the processes of loop C, the satellite signal acquisition unit 251 sets a first comparison threshold based on the difference in signal quality of the assumed acquisition satellites of the corresponding combination (step C3). Specifically, the satellite signal acquisition unit 251 reads the first comparison threshold 2723 corresponding to the difference 2721 between the signal quality of one assumed acquisition satellite of the combination and the signal quality of the other assumed acquisition satellite by referencing the first comparison threshold table 272.

After that, the satellite signal acquisition unit 251 compares the comparison target data portions of the assumed acquisition satellites of the corresponding combination bit by bit (step C5). Moreover, the satellite signal acquisition unit 251 calculates the first match rate based on the comparison result (step C7).

Subsequently, the satellite signal acquisition unit 251 determines whether the first match rate exceeds a first comparison threshold (step C9). When it is determined that the first match rate exceeds the first comparison threshold (step C9: Yes), it is determined that a cross correlation has occurred (step C11). Moreover, the satellite signal acquisition unit 251 updates the cross correlation determination data 277 of the storage unit 27 by determining a satellite having the lower signal quality among the assumed acquisition satellites of the corresponding combination as a false acquisition satellite (step C13). Moreover, the process proceeds to the next comparison satellites.

On the other hand, when it is determined in step C9 that the first match rate is equal to or smaller than the first comparison threshold (step C9: No), the satellite signal acquisition unit 251 determines that a correct correlation has occurred (step C15). Moreover, the satellite signal acquisition unit 251 updates the cross correlation determination data 277, and the process proceeds to the next combination.

After performing the processes of steps C3 to C15 with respect to all combinations, the satellite signal acquisition unit 251 terminates the processes of loop C (step C17). Moreover, the satellite signal acquisition unit 251 terminates the first cross correlation determination process.

Returning to the initial acquisition process in FIG. 12, the satellite signal acquisition unit 251 removes the measurement information of the assumed acquisition satellite determined to be a false acquisition satellite from the assumed acquisition satellite-based measurement information 276 stored in the storage unit 27 (step B27). This is to prevent the measurement information of a satellite determined to be a false acquisition satellite from being used for position calculation.

Subsequently, the satellite signal acquisition unit 251 re-searches for satellites (step B29). Specifically, the satellite signal acquisition unit 251 changes a frequency search range for the assumed acquisition satellite determined to be a false acquisition satellite and tries to acquire a GPS satellite signal again. This is because when a satellite is correctly acquired by re-searching for false acquisition satellites, the number of satellites usable for position calculation increases, whereby the performance of position calculation can be improved. After performing such a process, the satellite signal acquisition unit 251 terminates the initial acquisition process.

Before re-searching for satellites in step B29, it may be determined whether a number of measurement information corresponding to or more than the number of satellites (hereinafter referred to as a "position calculable satellite count") of which the position can be calculated is stored in the assumed acquisition satellite-based measurement information 276. Moreover, the re-searching for satellites in step B29 may be performed only when the position calculable satellite count has not been reached. The position calculable satellite count can be determined to be "3" for 2-dimensional positioning and "4" for 3-dimensional positioning, for example.

Returning to the baseband processing in FIG. 11, after performing the initial acquisition process, the position calculation unit 253 performs a position calculation process using the measurement information of the respective acquisition satellites stored in the assumed acquisition satellite-based measurement information 276 and the navigation messages decoded for the respective acquisition satellites (step A7). In the position calculation process, a well-known position calculation computation using the least-square method or the Kalman filter, for example, is performed using the pseudo-range between the mobile phone 1 and each acquisition satellite, to thereby calculate the position of the mobile phone 1.

The pseudo-range can be calculated in the following manner. That is, the integer part of the pseudo-range between each acquisition satellite and the mobile phone 1 is calculated using the satellite position of each acquisition satellite obtained from the navigation message and the initial position of the mobile phone 1. Moreover, the fractional part of the pseudo-range between each acquisition satellite and the mobile phone 1 is calculated using the code phase included in the measurement information. By combining the integer part and the fractional part calculated in this way, the pseudo-range is obtained.

Subsequently, the position calculation unit 253 outputs the position (position coordinate) calculated by the position calculation process to the host processing unit 30 (step A9). Moreover, the processing unit 25 determines whether or not to terminate the process (step A11). When it is determined not to terminate the process (step A11: No), the flow returns to step A1. Moreover, when it is determined to terminate the process (step A11: Yes), the baseband processing ends.

Moreover, when it is determined in step A1 that the present positioning operation is not the initial positioning operation after power-on (step A1: No), the satellite signal acquisition unit 251 performs a normal acquisition process (step A5). In the normal acquisition process, the satellite signal acquisition unit 251 selects a satellite positioning in the sky of the mobile phone 1 as an acquisition target satellite based on the navigation message decoded by the initial acquisition process. Moreover, the satellite signal acquisition unit 251 acquires a GPS satellite signal using a replica C/A code corresponding to each of the respective acquisition target satellites.

Although not illustrated in the flowchart, in the normal acquisition process, it is preferable to perform the cross correlation determination process similarly to the initial acquisition process to determine whether a cross correlation has occurred. That is, the respective acquisition target satellites are used as the assumed acquisition satellites, and the decoded navigation messages are compared for each combination of a certain assumed acquisition satellite and another assumed acquisition satellite to thereby determine a cross correlation.

2-4. Operational Effect

In the baseband processing circuit unit 20, the processing unit 25 executes a first decoding of decoding the navigation message carried on the GPS satellite signal using the first replica C/A code and a second decoding of decoding the navigation message using the second replica C/A code. Moreover, the occurrence of a cross correlation is determined based on the result of the first decoding and the result of the second decoding.

That is, among the first and second decoding results, the data portions of the first to third subframes in which the unique information of the GPS satellite included in the navigation message is stored are used as comparison targets, and the data streams thereof are compared with each other bit by bit. Moreover, a threshold determination is performed on the first match rate obtained as the result of the comparison to thereby determine the occurrence of a cross correlation.

When a cross correlation has occurred, navigation messages of the same contents can be decoded for a plurality of assumed acquisition satellites. Thus, the decoding results for a plurality of assumed acquisition satellites are compared with each other, and when it is determined that navigation messages of the same contents are decoded, it is determined that a cross correlation has occurred. As above, it is possible to appropriately determine the occurrence of a cross correlation by a simple method of comparing the decoding results of navigation messages with each other.

Moreover, in the present embodiment, the comparison threshold is changed based on the difference between the signal quality of an acquisition signal of an assumed acquisition satellite and the signal quality of an acquisition signal of other assumed acquisition satellite for comparison. Specifically, the threshold determination is performed on the first match rate by setting the first comparison threshold to a smaller value as the difference in signal quality increases. In this way, it is possible to optimize the cross correlation determination criteria and to determine the occurrence of a cross correlation more reliably.

3. Modified Example

An embodiment to which the invention can be applied is not limited to the above embodiment, but the embodiment can be appropriately modified within a range without departing from the spirit of the invention. Hereinafter, a modified example will be described. The same constituent elements and the same process steps in the flowcharts as the above embodiment will be denoted by the same numerals, and description thereof will not be provided. Thus, only the difference from the above embodiment will be described.

3-1. Determination Process Corresponding to Respective Determination Methods

The above embodiment is an embodiment of the mobile phone 1 which performs a cross correlation determination process corresponding to "1-1. First Determination Method". However, an embodiment of the mobile phone 1 which performs a cross correlation determination process corresponding to "1-2. Second Determination Method" or "1-3. Third Determination Method" can be configured similarly.

Figure 14:
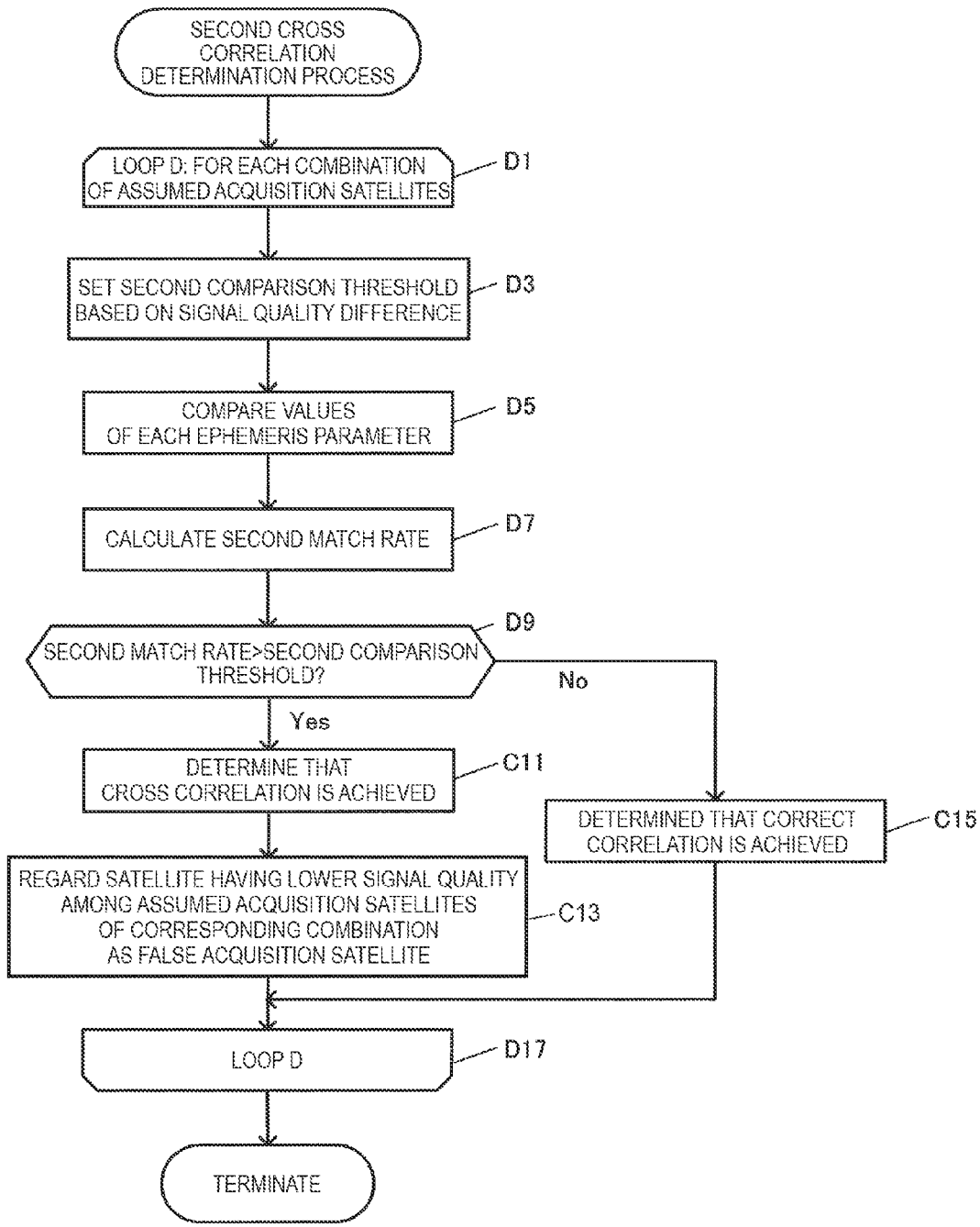
FIG. 14 is a flowchart showing the flow of a second cross correlation determination process.

FIG. 14 is a flowchart showing the flow of the second cross correlation determination process which the satellite signal acquisition unit 251 of the mobile phone 1 of the above embodiment executes instead of the first cross correlation determination process in FIG. 13. The second cross correlation determination process is a process corresponding to "1-2. Second Determination Method".

The satellite signal acquisition unit 251 performs the processes of loop D with respect to each combination of assumed acquisition satellites to be compared (steps D1 to D17). In the processes of loop D, the satellite signal acquisition unit 251 sets a second comparison threshold based on the difference in signal quality of assumed acquisition satellites of the corresponding combination (step D3). The second comparison threshold is a threshold value of the second match rate. The first determination method is different from the second determination method in regard to the comparison target. Thus, since a comparison threshold different from that used in the first determination method is used, the comparison threshold used in the second determination method will be referred to as a "second comparison threshold" so as to be distinguished from the "first comparison threshold".

The second comparison threshold can be set in a manner similar to the above embodiment by storing a second comparison threshold table having the same table configuration as the first comparison threshold table 272 shown in FIG. 9 in the storage unit 27. The magnitude relationship of the second comparison threshold corresponding to the difference in signal quality may be set in a manner similar to that of the first comparison threshold table 272.

Subsequently, the satellite signal acquisition unit 251 compares the values of the respective ephemeris parameters (step D5) and calculates the second match rate based on the comparison result (step D7). Moreover, the satellite signal acquisition unit 251 determines the occurrence of a cross correlation based on whether the second match rate exceeds the second comparison threshold (step D9). The subsequent processes are the same as those of the first cross correlation determination process.

Figure 15:
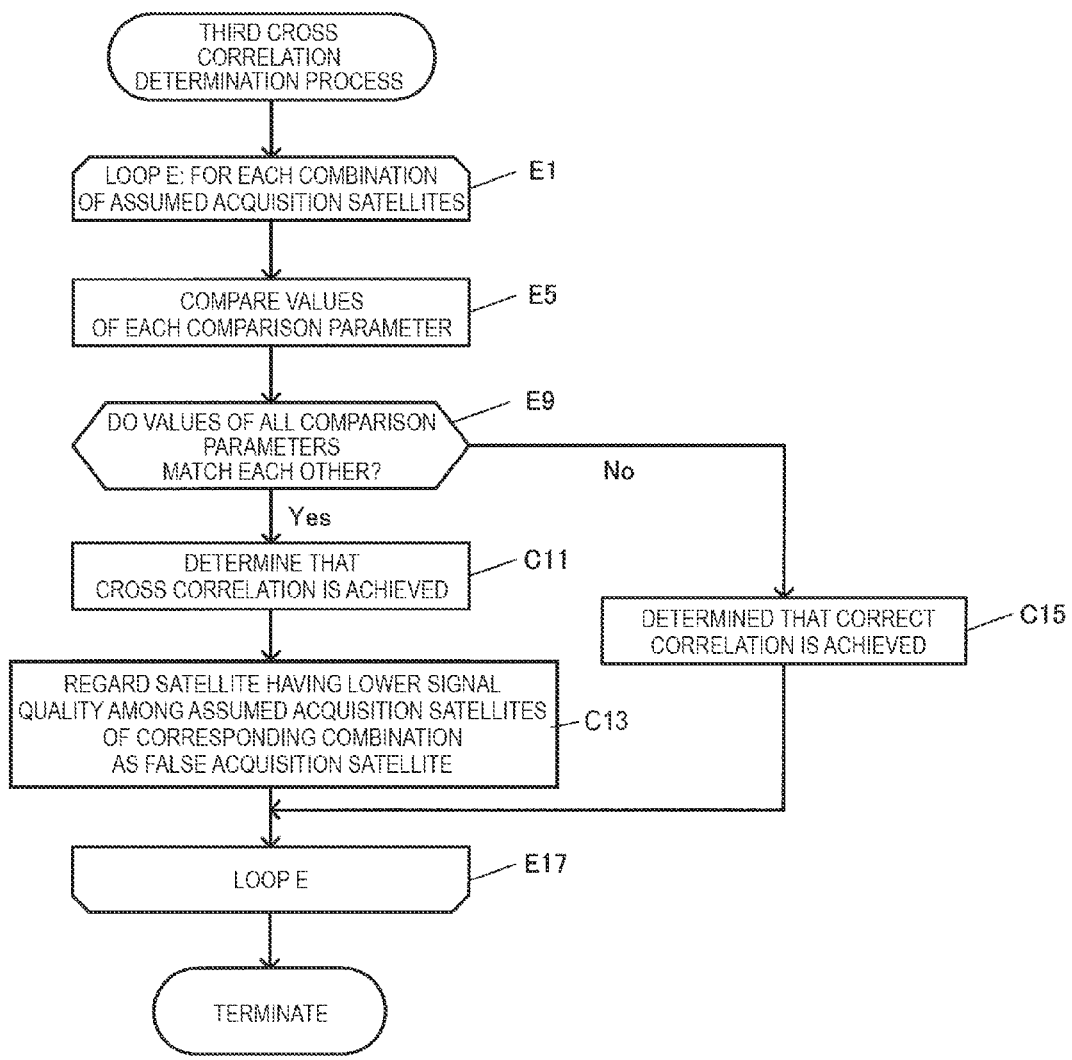
FIG. 15 is a flowchart showing the flow of a third cross correlation determination process.

FIG. 15 is a flowchart showing the flow of the third cross correlation determination process which the satellite signal acquisition unit 251 of the mobile phone 1 of the above embodiment executes instead of the first cross correlation determination process in FIG. 13. The third cross correlation determination process is a process corresponding to "1-3. Third Determination Method".

The satellite signal acquisition unit 251 performs the processes of loop E with respect to each combination of assumed acquisition satellites to be compared (steps E1 to E17). In the processes of loop E, the satellite signal acquisition unit 251 compares the values of respective comparison parameters (step E5). Moreover, the satellite signal acquisition unit 251 determines the occurrence of a cross correlation based on whether the values of all comparison parameters match each other (step E9). The subsequent processes are the same as those of the first cross correlation determination process.

Figure 16:
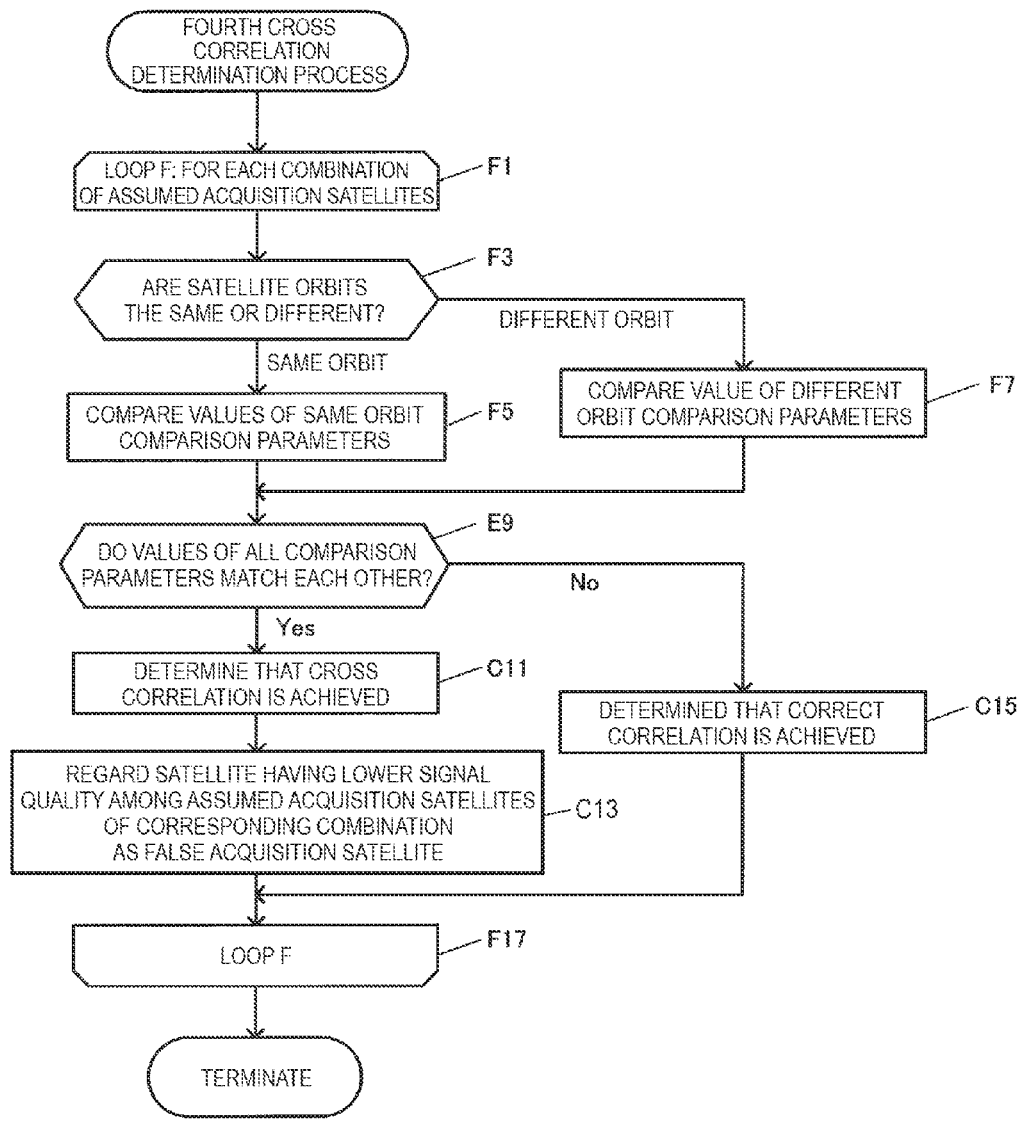
FIG. 16 is a flowchart showing the flow of a fourth cross correlation determination process.

FIG. 16 is a flowchart showing the flow of a fourth cross correlation determination process which improves the third cross correlation determination process described above.

First, the satellite signal acquisition unit 251 performs the processes of loop F with respect to each combination of assumed acquisition satellites to be compared (steps F1 to F17). In the processes of loop F, the satellite signal acquisition unit 251 determines whether the assumed acquisition satellites of the corresponding combination are on the same satellite orbit or on different satellite orbits (step F3).

When the assumed acquisition satellites are determined to be on the same satellite orbit (step F3: same orbit), the satellite signal acquisition unit 251 compares the values of same orbit comparison parameters (step F5). Moreover, when the assumed acquisition satellites are determined to be on different satellite orbits (step F3: different orbit), the satellite signal acquisition unit 251 compares the values of different orbit comparison parameters (step F7). Moreover, the satellite signal acquisition unit 251 proceeds to the process of step E9.

3-2. Combination of Determination Methods

Since a cross correlation determination may not be performed properly with a single determination method, across correlation determination may be performed with a combination of a plurality of determination methods. For example, when bit values are lost during decoding of navigation messages, it may not be possible to determine a cross correlation correctly with "1-1. First Determination Method" solely. Thus, the cross correlation determination may be performed with a combination of "1-1. First Determination Method" and "1-3. Third Determination Method".

Moreover, when the values of comparison parameters are not acquired properly due to errors in decoding navigation messages, it may not be possible to determine a cross correlation correctly with "1-3. Third Determination Method" solely. Thus, the cross correlation determination may be performed with a combination of "1-3. Third Determination Method" and "1-2. Second Determination Method".

Figure 17:
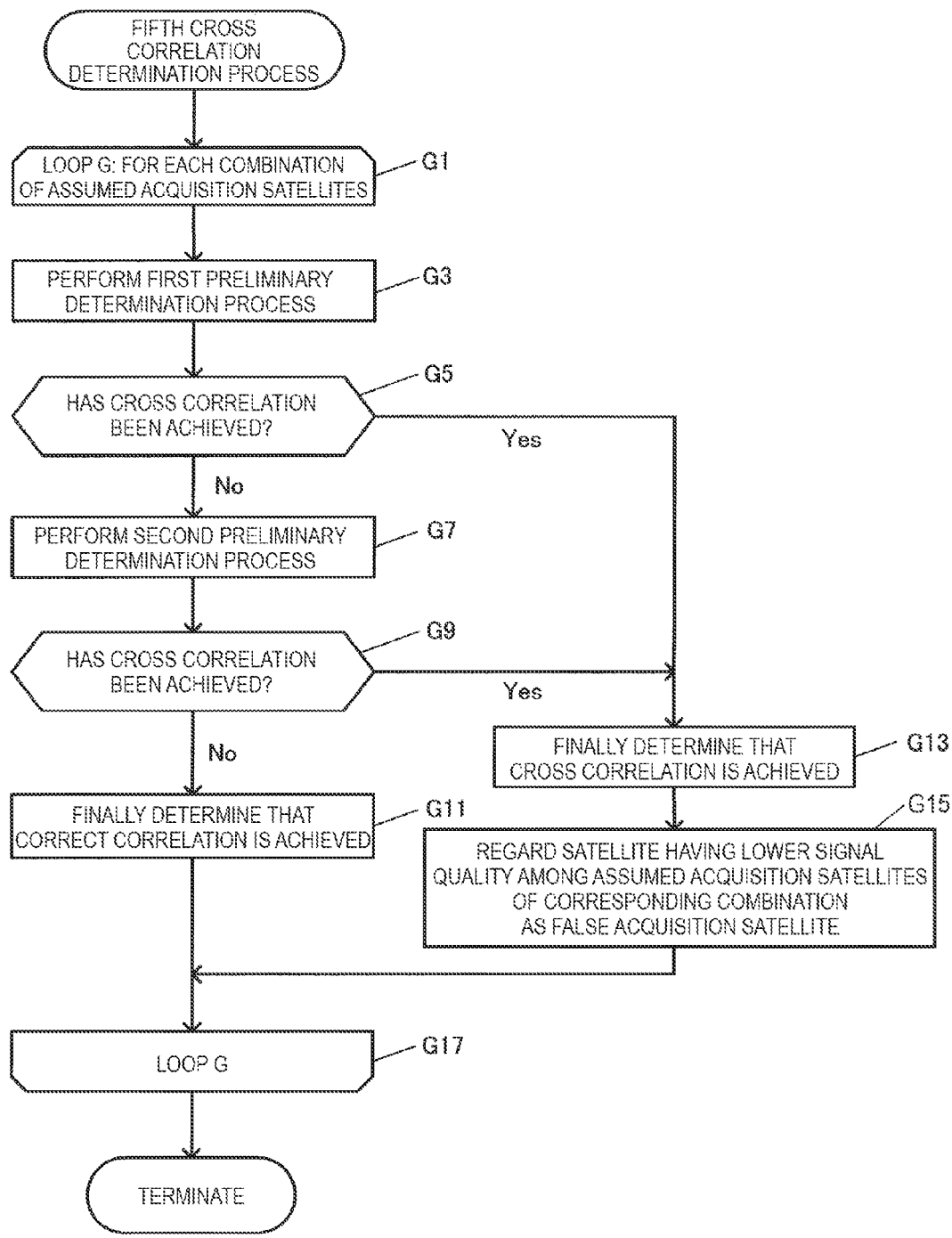
FIG. 17 is a flowchart showing the flow of a fifth cross correlation determination process.

FIG. 17 is a flowchart showing the flow of a fifth cross correlation determination process which is an example of a process that is executed by the satellite signal acquisition unit 251 in the above-mentioned case.

First, the satellite signal acquisition unit 251 executes the processes of loop G with respect to respective combinations of the assumed acquisition satellites to be compared (steps G1 to G17). In the processes of loop G, the satellite signal acquisition unit 251 performs a first preliminary determination process (step G3). Specifically, the satellite signal acquisition unit 251 preliminarily determines the occurrence of across correlation in accordance with "1-3. Third Determination Method," for example.

Subsequently, the satellite signal acquisition unit 251 determines whether a cross correlation determination is achieved in the first preliminary determination process (step G5). When it is determined that a cross correlation determination is not achieved (step G5: No), the satellite signal acquisition unit 251 performs a second preliminary determination process (step G7). Specifically, the satellite signal acquisition unit 251 preliminarily determines the occurrence of a cross correlation in accordance with "1-2. Second Determination Method," for example.

Subsequently, the satellite signal acquisition unit 251 determines whether a cross correlation determination is achieved in the second preliminary determination process (step G9). When it is determined that a cross correlation determination is not achieved (step G9: No), the satellite signal acquisition unit 251 finally determines that a correct correlation is achieved (step G11), and the process proceeds to the next combination.

In contrast, when it is determined in either step G5 or G9 that a cross correlation determination is achieved (step G5: Yes or step G9: Yes), the satellite signal acquisition unit 251 finally determines that a cross correlation is achieved (step G13). Moreover, after a false acquisition satellite is determined (step G15), the process proceeds to the next satellite combination.

3-3. Comparison Target of Navigation Message

The comparison target data portions used when comparing navigation messages may be changed appropriately as long as they are portions in which the unique information of satellites within the navigation message is stored. For example, all of the first to third subframes may be used as comparison targets, and any one of the first to third subframes may be used as comparison targets. Moreover, comparison may be performed word by word rather than subframe by subframe.

3-4. Comparison Parameter

In addition to the combination of comparison parameters described in the above-described embodiment, the comparison parameters may be changed appropriately. For example, the epoch time "$t_{oe}$" and the issue of data of ephemeris "IODE" are the essential parameters necessary for identifying the ephemeris. Thus, in addition to the combinations (1) to (3) of comparison parameters described in the section of "1. Principle," comparison may be performed using combinations of comparison parameters of (4) the issue of data of ephemeris "IODE" and the epoch time "$t_{oe}$" and (5) the issue of data of ephemeris "IODE", the epoch time "$t_{oe}$", and the mean anomaly at reference time "$M_0$".

3-5. Calculation of Signal Quality

In the above embodiment, although a case of calculating the SNR as the signal quality of an acquisition signal has been described, the method of calculating the signal quality is not limited to this. For example, a signal quality indicator XPR defined by Equation (2) below may be calculated and used as the signal quality of an acquisition signal.

$$XPR=(P_S-P_N)/P_S \quad (2)$$

Here, XPR is a value in the range of "0" to "1," and as the XPR approaches "1", it implies that the signal quality is high.

3-6. Change of Comparison Threshold

In the above embodiment, although the comparison threshold has been changed based on the difference in signal quality of acquisition signals of two assumed acquisition satellites to be compared, the method of changing the comparison threshold is not limited to this. For example, the comparison threshold may be changed based on the difference in acquisition frequency.

FIG. 18 is a diagram showing an example of a table configuration of a first comparison threshold table 272B which is stored in the storage unit 27 in this case instead of the first comparison threshold table 272 in FIG. 9. In the first comparison threshold table 272B, an acquisition frequency difference 2725 and a first comparison threshold 2727 are stored in a correlated manner.

More specifically, in the first comparison threshold table 272B, a smaller value is set as the first comparison threshold as the acquisition frequency difference 2725 decreases. A small acquisition frequency difference "Δf" implies that the two assumed acquisition satellites to be compared are searched with a neighboring frequency band. When a frequency search is performed with a neighboring frequency band, since the possibility of acquisition of the same satellite signal increases, the possibility of the occurrence of a cross correlation also increases. Thus, it is preferable to lower the cross correlation determination criteria (make it easy to determine a cross correlation) by setting the comparison threshold to a smaller value as the acquisition frequency difference "Δf" decreases.

According to the results of tests conducted by the present inventor, it was confirmed that a cross correlation occurred not only at neighboring frequencies but also at frequencies separated by 1 [kHz]. This is because the signal energy of the GPS satellite signal using C/A codes spreads over a 2-[MHz] frequency band around 1.57542 [GHz] due to a spectrum spread modulation method. Taking this into consideration, in the first comparison threshold table 272B, a magnitude of "Δf-1000N" (where N=0, 1, 2, ...) which is a subtraction of an integer multiple of "1 [kHz]=1000 [Hz]" from the acquisition frequency difference "Δf" is regarded to be the acquisition frequency difference, and the first comparison threshold is classified.

3-7. Determination of False Acquisition Satellite

In the above embodiment, the false acquisition satellite has been determined based on the signal quality of an acquisition signal. That is, it has been described that a satellite having the lower signal quality of the acquisition signal among the assumed acquisition satellites of each combination of assumed acquisition satellites is determined to be a false acquisition satellite. The determination of the false acquisition satellite may be performed based on the magnitude of a correlation value.

When a satellite signal is acquired correctly, the peak correlation value tends to increase as compared to when the satellite signal is acquired falsely. Thus, by comparing the magnitudes of peak correlation values of two assumed acquisition satellites to be compared, a satellite having the smaller peak correlation value may be determined to be a false acquisition satellite.

3-8. Electronic Apparatus

In the above embodiment, although a case in which the invention is applied to a mobile phone which is one kind of electronic apparatus has been described as an example, the electronic apparatuses to which the invention can be applied are not limited to this. For example, the invention can be similarly applied to other electronic apparatuses such as a car navigation device, a mobile navigation device, a PC, a PDA (Personal Digital Assistant), and a wristwatch.

3-9. Subject of Processing

In the above embodiment, although it has been described that the processing unit of the baseband processing circuit unit executes the cross correlation determination, the host processing unit of the electronic apparatus may execute the cross correlation determination.

Moreover, the processing may be divided in such a way that the acquisition of GPS satellite signals and the cross correlation determination are executed by the processing unit of the baseband processing circuit unit, and the position calculation is performed by the host processing unit of the electronic apparatus.

3-10. Satellite Positioning System

Moreover, in the above embodiment, although the GPS has been described as an example of the satellite positioning system, other satellite positioning systems such as WAAS (Wide Area Augmentation System), QZSS (Quasi Zenith Satellite System), GLONASS (GLObal NAvigation Satellite System), and GALILEO may be used.

What is claimed is:

1. A cross correlation determination method comprising:
   executing a first decoding of decoding a navigation message included in a received positioning system satellite signal using a first pseudo coarse and acquisition (C/A) code corresponding to a first positioning system satellite;
   executing a second decoding of decoding the navigation message using a second pseudo C/A code corresponding to a second positioning system satellite, the second pseudo C/A code having a code sequence different than the first pseudo C/A code; and
   determining an occurrence of a cross correlation by comparing a result of the first decoding with a result of the second decoding.

2. The cross correlation determination method according to claim 1,
   wherein the determining includes comparing information unique to a positioning system satellite, included in the navigation message among the first and second decoding results.

3. The cross correlation determination method according to claim 2,
   wherein the comparing includes comparing the information bit by bit, and wherein the determining includes determining the occurrence of the cross correlation based on the result of the bit-by-bit comparison.

4. The cross correlation determination method according to claim 2,
wherein the comparing includes comparing data storage portions of ephemeris of a positioning system satellite, included in the navigation message among the first and second decoding results.

5. The cross correlation determination method according to claim 4,
wherein the comparing includes comparing at least a number identifying ephemeris or a value designating a positioning system satellite position.

6. The cross correlation determination method according to claim 1, further comprising
changing determination criteria of the cross correlation based on a difference between a signal quality during the first decoding and a signal quality during the second decoding.

7. The cross correlation determination method according to claim 1, further comprising
changing determination criteria of the cross correlation based on a difference between an acquisition frequency during the first decoding and an acquisition frequency during the second decoding.

8. A cross correlation determination method according to claim 1, wherein the occurrence of a cross correlation is determined when a match rate between the result of the first decoding and the result of the second decoding is greater than a predetermined threshold.

9. A cross correlation determination device comprising:
a decoding unit configured to: executes a first decoding of decoding a navigation message included in a received positioning system satellite signal using a first pseudo coarse and acquisition (C/A) code corresponding to a first positioning system satellite, and execute a second decoding of decoding the navigation message using a second pseudo C/A code corresponding to a second positioning system satellite, the second pseudo C/A code having a code sequence different than the first pseudo C/A code; and
a determination unit configured to determines the occurrence of a cross correlation by comparing the result of the first decoding with the result of the second decoding.

* * * * *